United States Patent
Martinec et al.

(10) Patent No.: US 11,941,052 B2
(45) Date of Patent: Mar. 26, 2024

(54) ONLINE CONTENT EVALUATION SYSTEM AND METHODS

(71) Applicant: Avast Software s.r.o., Prague (CZ)

(72) Inventors: Dan Martinec, Nymburk (CZ); Yury Kasimov, Prague (CZ); Juyong Do, Cupertino, CA (US)

(73) Assignee: Avast Software s.r.o., Prague (CZ)

( * ) Notice: Subject to any disclaimer, the term of this patent is extended or adjusted under 35 U.S.C. 154(b) by 275 days.

(21) Appl. No.: 17/342,463

(22) Filed: Jun. 8, 2021

(65) Prior Publication Data

US 2022/0391445 A1 Dec. 8, 2022

(51) Int. Cl.
G06F 16/835 (2019.01)
G06F 40/295 (2020.01)
G06N 20/00 (2019.01)
G06Q 30/0201 (2023.01)

(52) U.S. Cl.
CPC .......... *G06F 16/835* (2019.01); *G06F 40/295* (2020.01); *G06N 20/00* (2019.01); *G06Q 30/0201* (2013.01)

(58) Field of Classification Search
CPC .. G06F 16/835; G06F 40/295; G06F 16/9032; G06F 16/90335; G06F 40/143; G06F 40/211; G06F 40/216; G06F 40/284; G06F 40/289; G06F 40/30; G06N 20/00; G06Q 30/0201
See application file for complete search history.

(56) References Cited

U.S. PATENT DOCUMENTS 8,793,273 B1 * 7/2014 Sadovsky ............... G06F 8/427
707/769

9,177,053 B2 * 11/2015 Myslinski ............ H04N 21/258
9,892,109 B2 * 2/2018 Myslinski .............. G06Q 50/01
2014/0365410 A1 * 12/2014 Gallant .................... G06N 5/04
706/12
2017/0039176 A1 * 2/2017 Broderick ............. G06F 40/166
2020/0202071 A1 6/2020 Ghulati
2022/0129636 A1 * 4/2022 Baughman ............. G06N 3/045

FOREIGN PATENT DOCUMENTS

EP 1993052 A2 * 11/2008 ............. G06F 16/93
WO WO-2019043379 7/2019

OTHER PUBLICATIONS

Bhatt et al. ("On the Benefit of Combining Neural, Statistical and External Features for Fake News Identification" (2017) https://arxiv.org/pdf/1712.03935.pdf) (Year: 2017).*

* cited by examiner

*Primary Examiner* — Pierre Louis Desir
*Assistant Examiner* — Keisha Y. Castillo-Torres
(74) *Attorney, Agent, or Firm* — Dovas Law, P.C.

(57) ABSTRACT

A method including detecting a webpage accessed by a user on a computing device via a browser. Content on the webpage is determined, and a model is applied to the content to determine a plurality of keyword sets. A network search is performed based on each of the plurality of keyword sets to generate a plurality of search results. The plurality of search results are compared to the content, and the plurality of search results are compared to each other. A factualness of the content is determined based on the comparing of the plurality of search results to the content and based on the comparing of the plurality of the search results to each other, and the user is notified via the browser of the factualness of the content.

34 Claims, 17 Drawing Sheets

1402

```
"url": "https://tttpagez.com/story.php?id=5521984901",

"title": "William Rudolfo Accuses Bittenger of Preparing to
Photograph Financial Aid Beneficiaries"

"description": " 'What we're proposing is unfair' ",

"text": "William Rudolfo Accuses Bittenger of Preparing to
Photograph Financial Aid Beneficiaries :: Tttpagez - The
Newzy Junction William Rudolfo Accuses Bittenger of
Preparing to Photograph Financial Aid Beneficiaries
'What we're proposing is unfair' EXCERPT: RUDOLFO:
"First of all, what we're proposing is unfair. I realize
that's not a word they typically use in governments, but
it's unfair. See what he's proposing right - see what
this minister's proposing right now. See what people
have tried previously. They're going to photograph
financial aid beneficiaries, they're slicing a trillion
credits out of the - all the collective protective
measures, this package, whether it's insurance, housing,
whether - universally." Copyright Tttpagez Inc. 2021.
All Rights Reserved"
```

FIG. 5

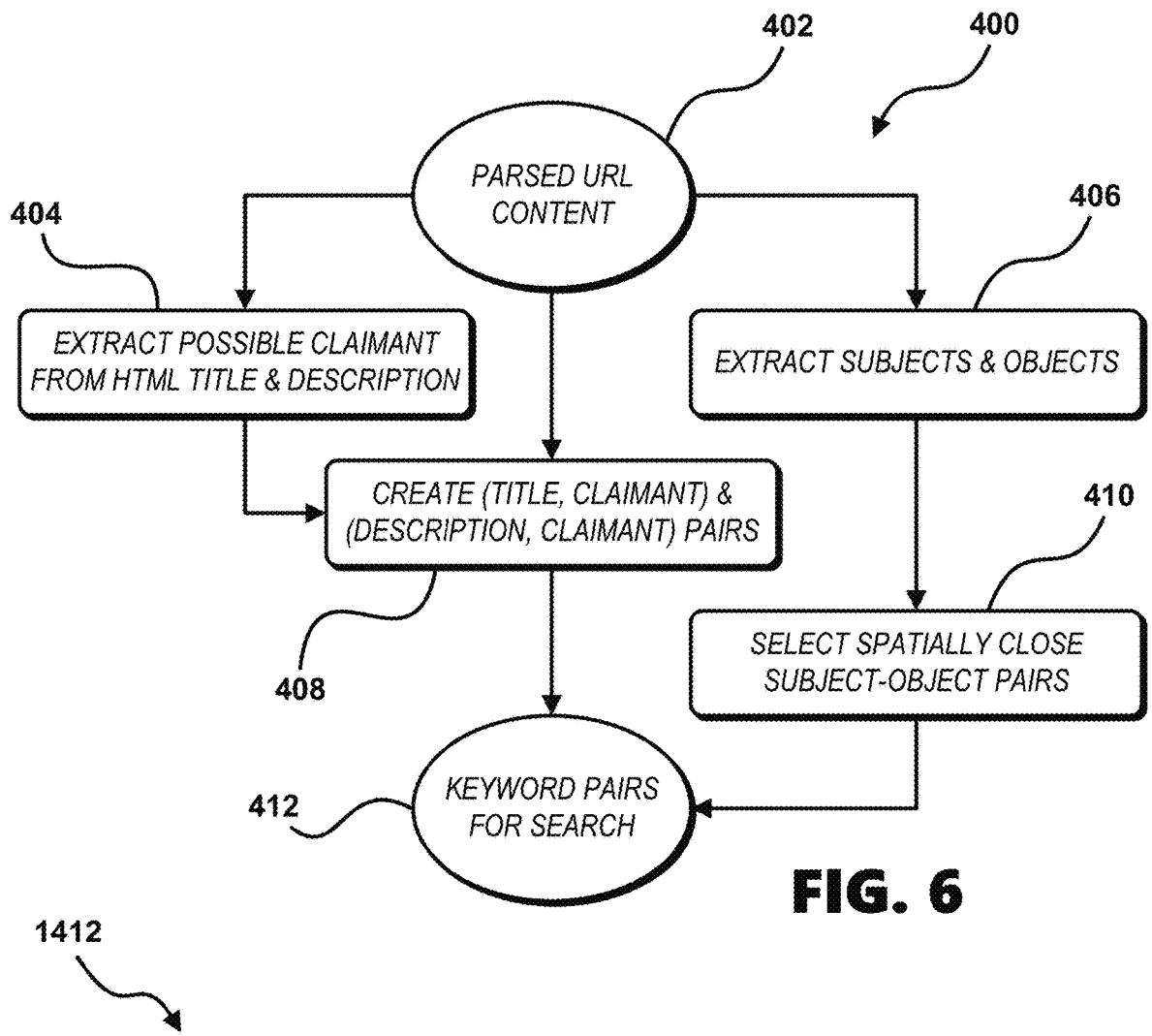

```
{"claims":
    [{"text":" Garoundaland Highway Overseer Gerald Hanover,
a governmental ally to Garoundaland Minister Jason
Bittenger, ordered Road Service laborers to "slow the
traffic down" to help Bittenger win the 2021 ministerial
election.",
    "claimReview":
        [{"publisher": {"name": "Factychecky.com", "site":
"factychecky.com"},
        "url": "https://www.factychecky.com/fact-check/grs-
slowing-traffic-Bittenger/",
        "title": "Is GRS Purposefully Slowing Traffic To Help
Reelect Bittenger?",
        "reviewDate": "2021-08-06T12:22:00Z", "textualRating": "Unproven"}]}
```

FIG. 8

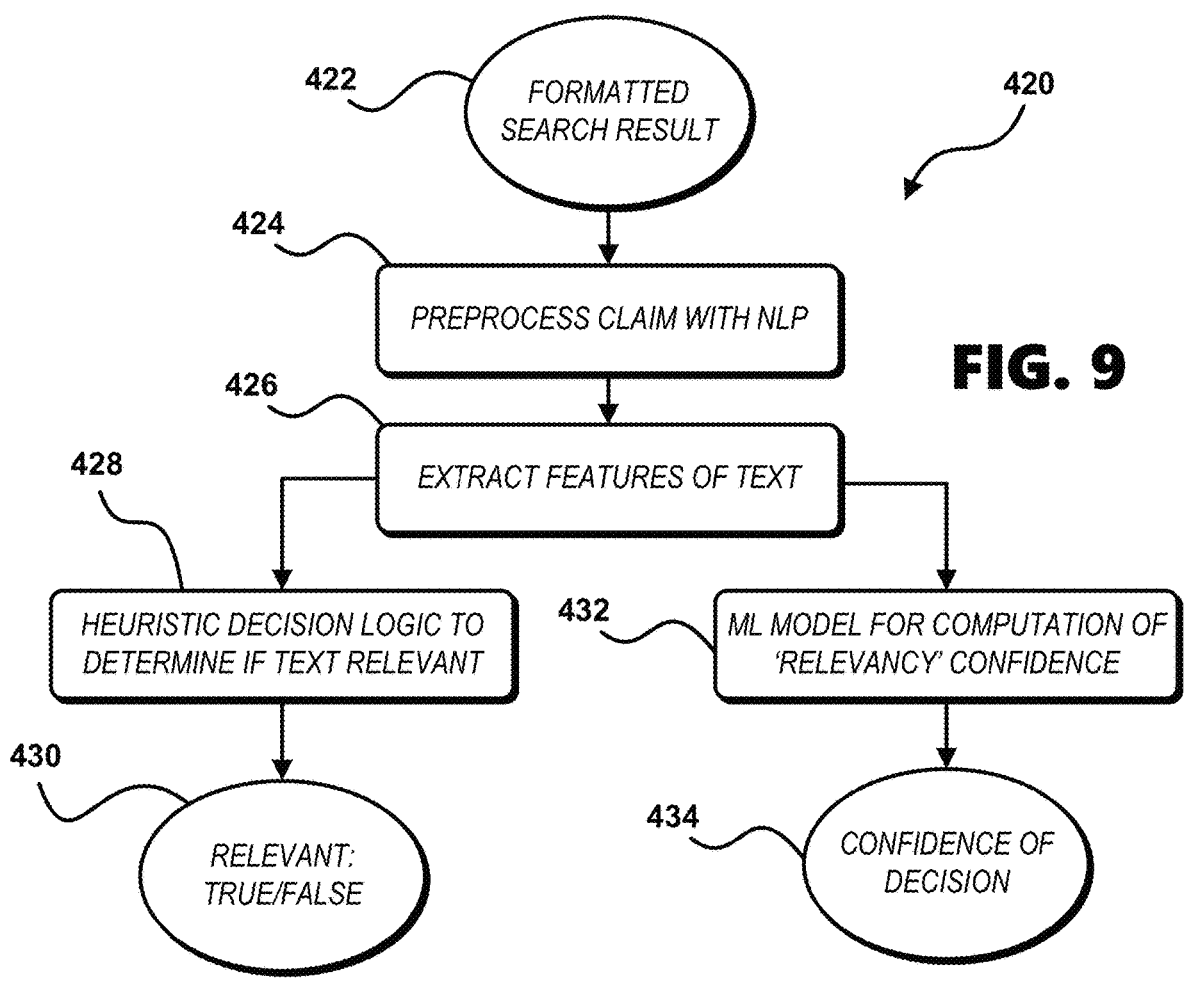

FIG. 9

- Vector_similarity_score - Vector of similarity_score, one item for each sentence
    - Similarity_ score - Representative score of similarity between the sentence in the article and the text of the claim. It ranges from 0 to 3. It is equal to the number of met conditions:
        - If Cosine similarity of word embeddings for the article sentence compared to the claim text is higher than 0.85.
        - If the subject of the article sentence is equal to the subject of the claim text.
        - If the object of the article sentence is equal to the object of the claim text.
- Vector_sentence_similarity - Vector of Cosine similarity of word embeddings, one item for each sentence.
- Total_similarity_score - Total number of elements in the vector_similarity_score that have value equal to 2 or 3.
- Keywords_hit_ratio - Number of keywords from the claim text and claimant that are present in the article in the lemmatised form divided by the total number of keywords from the claim text.
- Keywords_packed - Boolean value indicating if at least 70% of keywords from the claim text are present in any of 3 consecutive sentences.
- Keywords_loosely_packed - Boolean value indicating if 100% of keywords from the claim text are present in any of 30 consecutive sentences.
- Quote_ratio - If the text obtained from the internet search is a quote (indicated by being in parentheses) then the portion of the quote present in the article is computed. The number of consecutive characters is counted and then divided by the number of characters of the quote obtained from the internet search.

FIG. 10A a) The claim is a result of the "HTML title" ("keyword_pair_title") search & total_similarity_score >=2 & keywords_hit_ratio >=0.8
b) The claim is a result of the "HTML description" ("keyword_pair_description") search & total_similarity_score >= 3 & keywords_hit_ratio >= 0.8
c) The claim is a quote & keywords_packed = true & total_similarity_score >= 2 & keywords_hit_ratio >= 0.9
d) The claim is a quote & keywords_loosely_packed = true & max(vector_similarity_score) == 3
e) The claim is a quote & keywords_packed = true & max(vector_similarity_score)>= 2 & max(vector_sentence_similarity) >= 0.9
f) The claim is a quote & quote_ratio >= 0.80
g) keywords_packed = true & total_similarity_score >=2 & keywords_hit_ratio >= 0.9
h) max(vector_sentence_similarity) >= 0.97

FIG. 10B

```
{"claims":
    [{"text": "First of all, what we're proposing is unfair.
I realize that's not a word they typically use in
governments, but it's unfair. See what he's proposing
right — see what this minister's proposing right now.
See what people have tried previously. They're going to
photograph financial aid beneficiaries.",
    "claimant": "William Rudolfo",
    "claimDate": "2021-03-20T00:00:00Z",
    "claimReview":
        [{"publisher": {"name": "Rickstown Times", "site":
"rickstowntimes.com"},
        "url": "https://www.rickstowntimes.com/governments/
2021/03/12/Rudolfo-falsely-accuses-bittenger-over-
financial-aid-policy-suggested-by-rigel/",
        "title": "Analysis | Rudolfo falsely accuses Bittenger
over a financial aid policy ...",
"textualRating": "False"}]}
```

FIG. 11  ⟵ 2422

```
"query_type": "description",
"query_text": "William Rudolfo 'What we're proposing is
unfair'",
"claim_is_quote": True,
"claim_text_lemmatized": "unfair realize word use governments
unfair See right see minister right See people going
photograph financial aid beneficiaries"
"keywords_claim": ["William", "Rudolfo", "minister",
"people", "government", "beneficiary", "right", "see",
"realize", "go"]
"Vector_sentence_similarity": [0.71, 0.63, 0.78, 0.69, 0.28],
"vector_similarity_score": [0, 1, 2, 1, 1],
"total_similarity_score": 1,
"keywords_hit_ratio": 1.0,
"keywords_packed": True,
"keywords_loosely_packed": False,
"quote_ratio": 1.0,
"relevant": True,
"confidence": 0.49,
```

FIG. 12  ⟵ 2440

ONLINE CONTENT EVALUATION SYSTEM AND METHODS

FIELD OF INVENTION

The invention relates generally to online content evaluation, and more particularly to providing online content evaluation during user online activities.

BACKGROUND

Internet users are perpetually consuming content from various network locations. Frequently content is served as ostensibly factual articles in the form of news reports, opinion and editorial pieces, and satirical commentary. Online news and editorial content however are frequently lacking in factualness. While content is essentially limitless and easily accessible, the accuracy of discovered content is often dubious, limiting the use of the internet as a tool for computer users.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided which includes detecting a webpage accessed by a user on a computing device via a browser. Content on the webpage is determined, and a model is applied to the content to determine a plurality of keyword sets. A network search is performed based on each of the plurality of keyword sets to generate a plurality of search results. The plurality of search results are compared to the content, and the plurality of search results are compared to each other. A factualness of the content is determined based on the comparing of the plurality of search results to the content and based on the comparing of the plurality of the search results to each other, and the user is notified via the browser of the factualness of the content.

A further method is provided including detecting a webpage accessed by a user on a computing device via a browser. Content including a plurality of sentences on the webpage is determined. A model is applied to the content to determine a plurality of keyword sets. A network search is performed based on each of the plurality of keyword sets to generate a plurality of search results indicating a plurality of network locations including one or more claims including claim text. The claim text of each of the one or more claims is compared to each of the plurality of sentences to determine a plurality of similarities. A factualness of the content is determined based on the plurality of similarities. The user is notified via the browser of the factualness of the content via the browser.

A computing system including one or more hardware processors and one or more non-transitory computer-readable storage media coupled to the one or more hardware processors and storing programming instructions for execution by the one or more hardware processors, wherein the programming instructions, when executed, cause the computing system to perform operations. The operations include detecting a webpage accessed by a user on a computing device via a browser, determining content on the webpage, applying a model to the content to determine a plurality of keyword sets, and performing a network search based on each of the plurality of keyword sets to generate a plurality of search results. The operations further include comparing the plurality of search results to the content, comparing the plurality of search results to each other, determining a factualness of the content based on the comparing of the plurality of search results to the content and based on the comparing of the plurality of the search results to each other, and notifying the user via the browser of the factualness of the content via the browser.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 5 shows exemplary parsed content based on parsing content of the exemplary webpage of FIG. 3A.

FIG. 6 is a diagram showing a multi-headed query extraction process.

FIG. 7 shows exemplary keyword pairs derived from the exemplary parsed content of FIG. 5.

FIG. 8 shows a hypothetical exemplary formatted search result.

FIG. 9 is a diagram showing a relevancy and confidence determination process.

FIG. 10A shows heuristic features for producing a relevancy determination.

FIG. 10B shows heuristic rules for producing a relevancy determination.

FIG. 11 shows another an exemplary formatted search result.

FIG. 12 shows exemplary features and exemplary calculated intermediate results of the exemplary formatted search result of FIG. 11.

DETAILED DESCRIPTION OF ILLUSTRATIVE EMBODIMENT(S)

A portion of the disclosure of this patent document contains material which is subject to copyright protection.

The copyright owner has no objection to the facsimile reproduction by anyone of the patent document or the patent disclosure, as it appears in the Patent and Trademark Office patent file or records, but otherwise reserves all copyright rights whatsoever.

This herein described system and processes provide a person reading a network-hosted article on a personal computer, tablet, mobile phone or other electronic device with relevant information regarding the article. This relevant information can originate from publicly available network accessible sources that can be obtained by an internet search. The network accessible sources can include websites with a high level of factualness as measured by an algorithm described herein. The sources can include for example fact checking sites, such as Snopes.com™ and Polygraph.info™ which also provide peer-reviewed extended explanations regarding topics and their own predictions of factualness. Alternatively, the source can be a website or other online service providing content without any indication or assertion of the factualness of the content.

The processes described herein enable a user to be provided with information about how a given online article and its publisher are factually correct and in agreement with other articles regarding the same or similar topic. This factualness is measured and monitored over time and calculated for the user.

The processes described herein use publicly available sources. Information, which may itself be peer reviewed, from the publicly available sources that is relevant to an article, for example an article currently viewed by a user online, is aggregated to verify the factualness of the article. The described processes eliminate the necessity of a user to tediously perform a verification of the factualness of an online article by themselves. The processes described herein implement steps not practically performed by a human to verify factualness of an online article.

As described herein, an article accessed online by a user is represented with a multi-headed query pair used in performing an efficient (parallelizable) and optimized (without redundancy) internet search of relevant information. A process is introduced that evaluates if the search result is relevant to the article that the user is accessing or has accessed. A list of the most relevant and most trustworthy content (e.g., other online articles) regarding the topic of the article or regarding claims made in the article is provided. Factualness of the content of each universal resource locator ("URL") is evaluated and tracked over time. Factualness of websites are evaluated and tracked over time based on intra-site and inter-site consistency.

Figure 1:
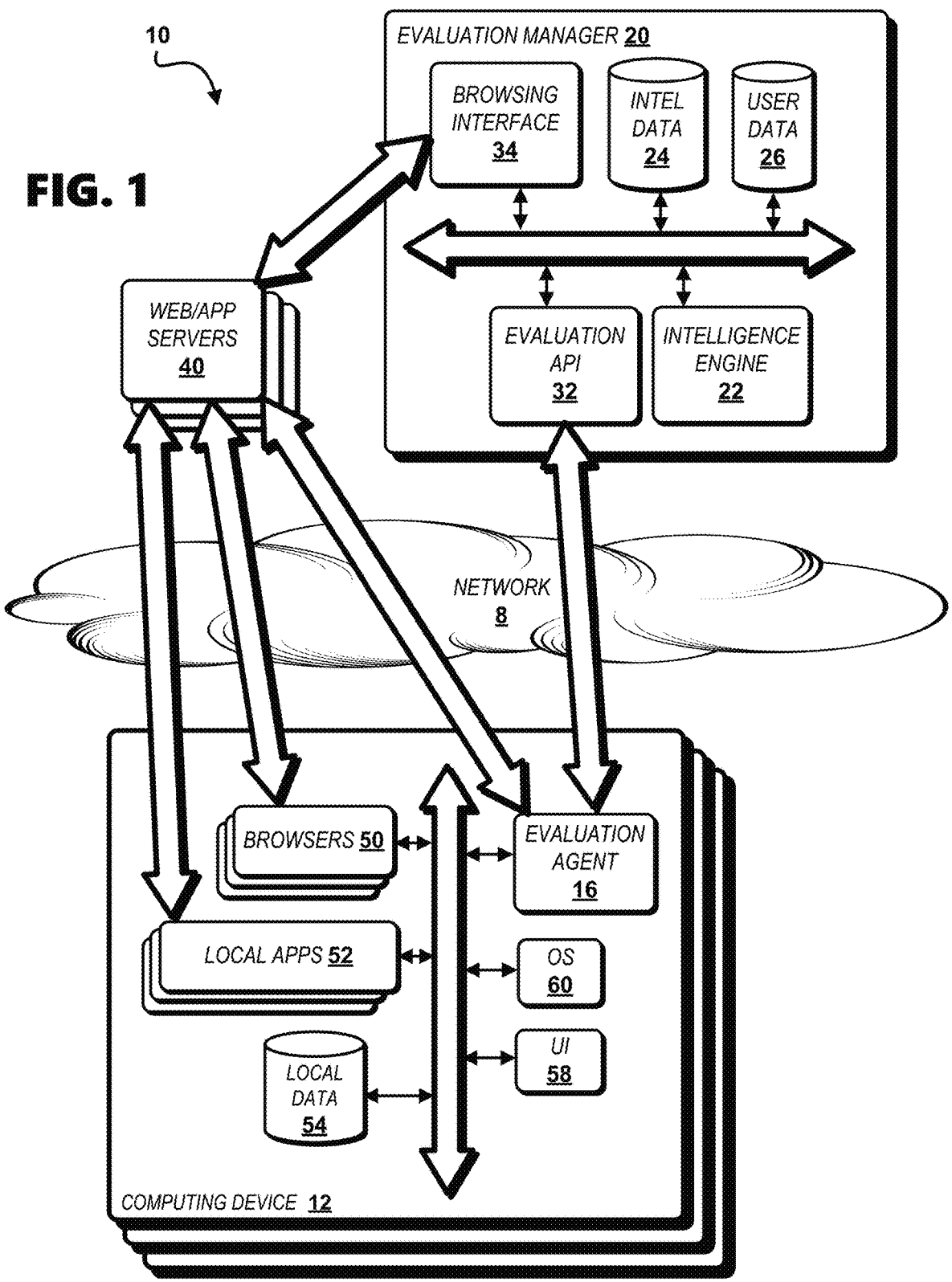
FIG. 1 shows a system in which fact checking of online content is enabled according to illustrative embodiments.

Referring to FIG. 1, a system 10 is provided for performing fact checking of online content accessed by users of computing devices 12 operating in a computer network 8. The computer network 8 includes one or more wired or wireless networks or a combination thereof, for example including a local area network (LAN), a wide area network (WAN), the internet, mobile telephone networks, and wireless data networks such as Wi-Fi™ and 3G/4G/5G cellular networks. Operating system 60 (hereinafter "OS 60") is executed on computing devices 12.

A network-connectable processor-enabled evaluation manager 20 coupled to a computing device 12 enables webpage evaluation information, including indications of the factualness of content of webpages and websites, to be provided to the computing device 12 via an evaluation agent 16. The evaluation agent 16 is beneficially provided integral with or as an extension to one or more browser applications 50 ("browsers") and provides notices to a user via a user interface 58 in windows enabled by the browsers 50. The evaluation agent 16 gathers browsing history and clickstreams from a browser 50 with which it is integrated or in communication with, which data is transmitted to the evaluation manager 20 via an evaluation application program interface ("API") 32. The evaluation manager 20 provides evaluation information to the evaluation agent 16 via the evaluation API 32 for enabling the evaluation agent 16 to provide real-time or near real-time information regarding content accessed by the user via a browser 50. Further, the evaluation agent 16 can engage with other local applications 52 for example standalone applications, plugins, add-ons, or extensions to existing applications, for example web browser plugins, to provide evaluation of content accessed via the local applications 52.

A website or application server 40 (hereinafter "web/app server") can function to enable local applications 52 or components of a local application 52. Web/app servers 40 can further enable services including network-based applications, webpages, or other services accessible via a browser 50. The evaluation agent 16 monitors user activity on the computing device 12 including a user's use of local and network-based applications and a user's accessing of websites and of content on local and network-based applications and websites, which data is fed to the evaluation manager 20 via the evaluation API 32. Records and statistics of such use are used by an intelligence engine 22 to perform searches of related content and evaluations of factualness of accessed content, which evaluations are stored in one or more of an intelligence datastore 24 or user datastore 26 of the evaluation manager 20 or a local datastore 54 of the computing device 12. Content accessed by users is periodically reevaluated for agreement with other online content and factualness via the intelligence engine 22. The evaluation manager 20 can engage and monitor web/app servers 40 via a browsing interface 34 for example by accessing websites, applications, or services to perform periodic reevaluation.

Figure 2:
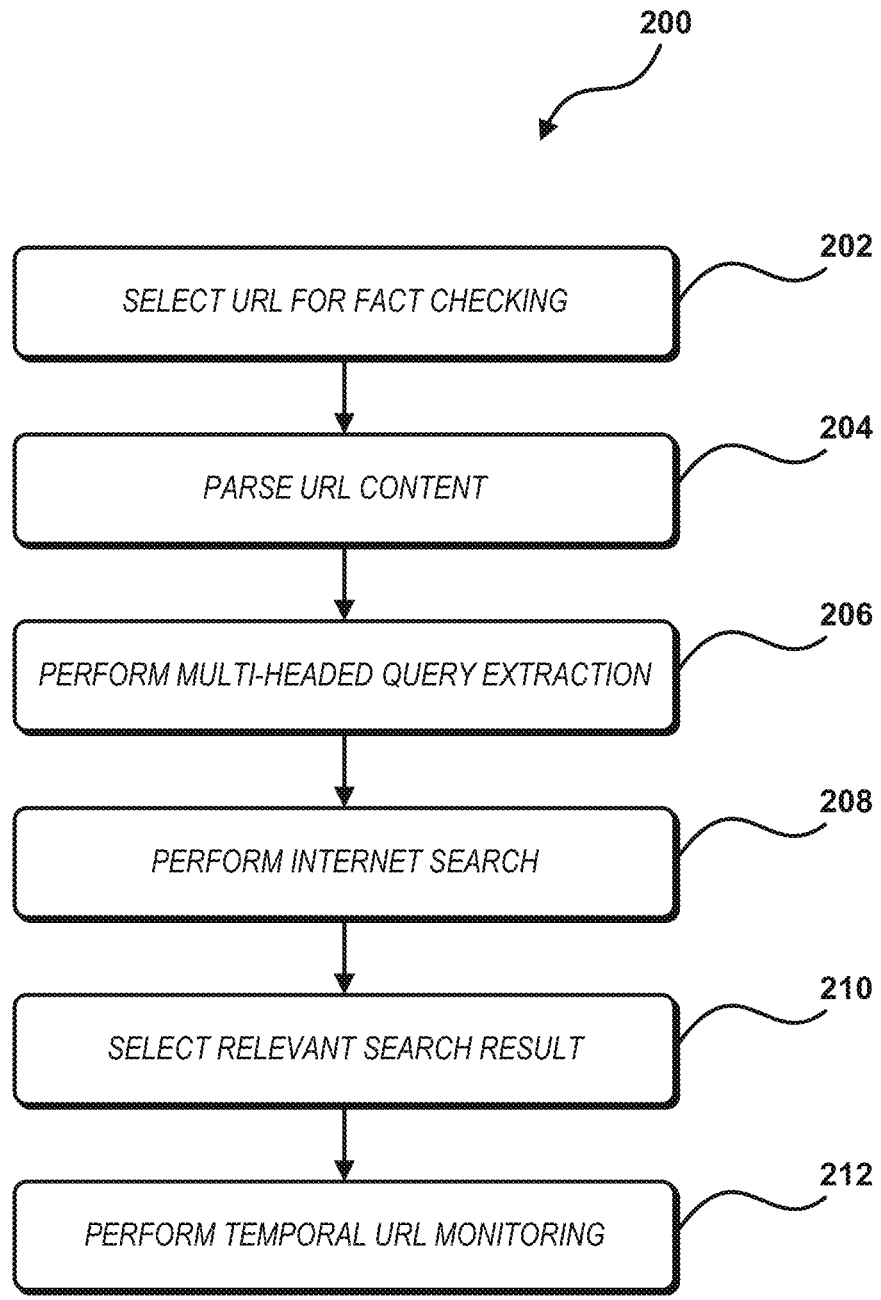
FIG. 2 is a diagram showing a method of fact checking content hosted at a network location.

Referring to FIG. 2, a method 200 of fact checking content hosted at a network location is shown. The method 200 is described with reference to the components of the system 10, including the evaluation manager 20, evaluation agent 16, and computing device 12. Alternatively, the method 200 can be performed via other systems and is not restricted to being implemented by the so described components.

In a step 202, a universal resource locator (URL) associated with network-accessible content is selected for fact checking. The URL is beneficially associated with a webpage accessed by a user on a computing device 12. The URL and associated content are beneficially received by the evaluation API 32 via the evaluation agent 16 for processing in real time or near real time via the intelligence engine 22 when the user accesses the webpage associated with the URL.

In an alternative implementation, URLs can be aggregated from a plurality of computing devices 12 via evaluation agents 16 and periodically processed in batches. For example, the selection of URLs can be run daily and include URLs aggregated from computing devices 12 on the previous day for which complete data is available. The URLs are beneficially cleaned and filtered by removing URLs with white spaces, by removing URLs containing an "@" symbol which suggests the URL is an email, by removing URLs which do not start with "http" or "https", and by removing parts after an "?" symbol which parts may contain private personal information. A hostname is extracted from each URL which is beneficially compared with a precompiled list of hostnames of news outlets. URLs associated with hostnames in the precompiled lists of news outlets are stored to generate a list of URLs associated with news articles to populate a table. Per each unique URL, it is calculated how many unique users accessed the URL, when the URL was accessed for the first time and for the last time, and how many times the URL is present in the table. The calculated information is inserted into a last state entry of the table as a rolling update. If a URL is already in the last state entry, then a last seen date entry, number of unique users, total access times are updated in the table. If a URL is not present, it is inserted into the table. URLs seen for the first time or URLs including new content are processed in step 204.

In the step 204, the content associated with the URL is parsed. Particularly, the HTML code of the URL is downloaded and parsed. The most informative HTML tags (e.g., "script", "style", "aside", "a", "label" and "select") are extracted, each tag beneficially extracted into a separate data file line. To filter out non-relevant text, short lines (e.g., less than 10 characters) are discarded and the lines are concatenated into a blob of text separated by whitespaces. If the HTML code includes the HTML meta tags "description" or "title", these are also extracted.

Figure 3A:
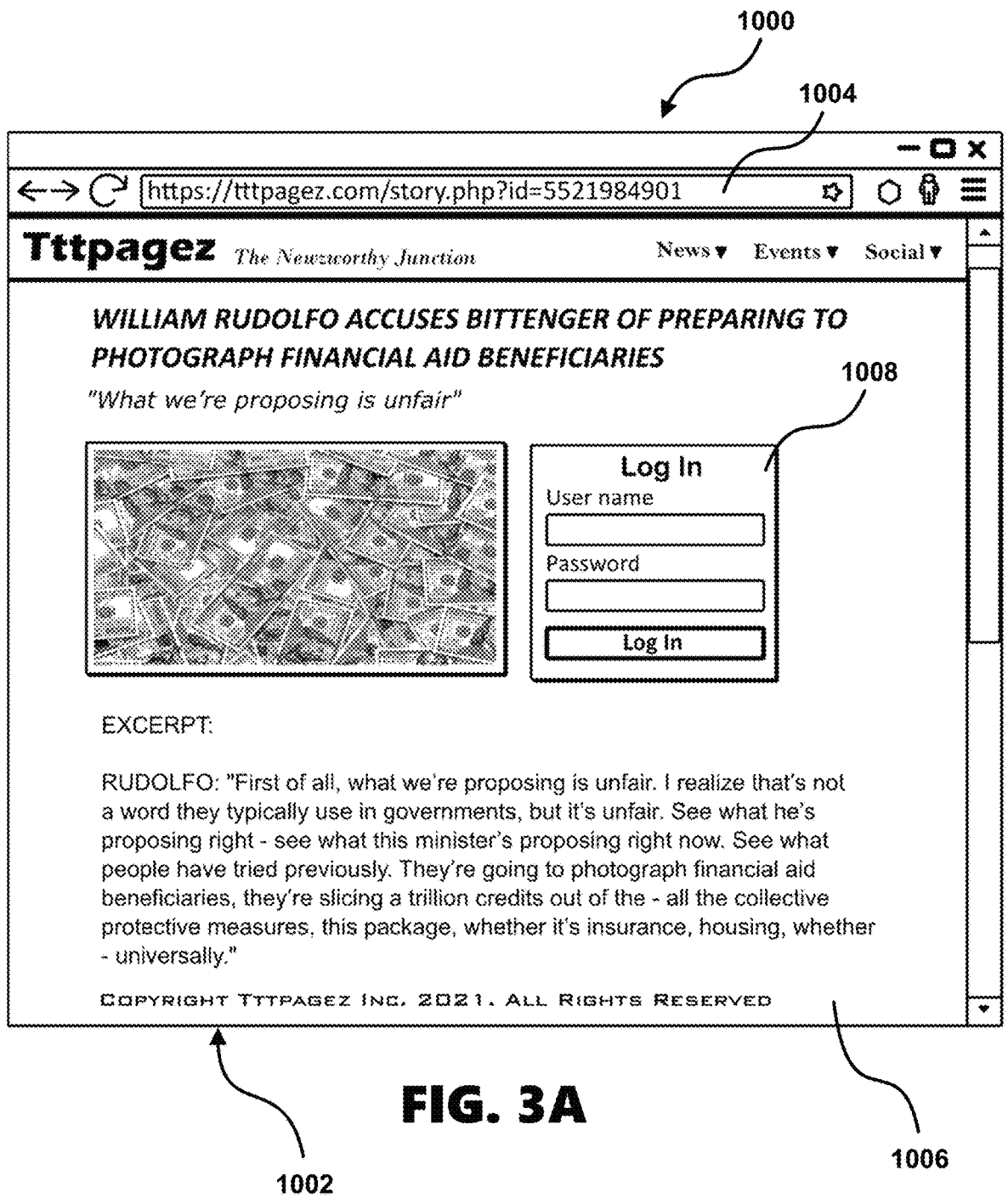
FIG. 3A shows a webpage browser window screen capture of a hypothetical exemplary webpage for the purpose of describing methods according to illustrative embodiments.

Referring to FIG. 3A, a first webpage browser window screen capture 1000 of a hypothetical exemplary webpage 1002 is shown. A URL is shown in a browser window address bar 1004, and the webpage 1002 includes content 1006 including a login module 1008 prompting a user for their username and password to login to a site associated with the webpage 1002. Referring to FIG. 5, exemplary parsed content 1402 based on parsing URL content of the exemplary webpage 1002 pursuant to the step 204 of the method 200 is shown. The exemplary parsed content 1402 indicates a subject URL of "https://tttpagez.com/story.php?id=5521984901", a title of the subject URL of "William Rudolfo Accuses Bittenger of Preparing to Photograph Financial Aid Beneficiaries", and a description of the content including "'What we're proposing is unfair'".

The exemplary parsed content 1402 further provides concatenated text including "William Rudolfo Accuses Bittenger of Preparing to Photograph Financial Aid Beneficiaries::Tttpagez—The Newzy Junction William Rudolfo Accuses Bittenger of Preparing to Photograph Financial Aid Beneficiaries 'What we're proposing is unfair' EXCERPT: RUDOLFO: 'First of all, what we're proposing is unfair. I realize that's not a word they typically use in governments, but it's unfair. See what he's proposing right—see what this minister's proposing right now. See what people have tried previously. They're going to photograph financial aid beneficiaries, they're slicing a trillion credits out of the—all the collective protective measures, this package, whether it's insurance, housing, whether—universally.' Copyright Tttpagez Inc. 2021. All Rights Reserved". As shown, even potentially non-relevant generic text such as "Copyright Tttpagez Inc. 2021. All Rights Reserved" is extracted from the HTML code. Non-relevant text does not create a problem in the method 200.

Referring to FIGS. 2 and 6, in a step 206, a multi-headed query extraction process 400 is performed based on parsed results from step 204 in which multi-headed query sets, beneficially pairs of keywords ("keyword pairs") 412 are extracted that are later used for a network search. In the query extraction process 400, one or more models are applied to parsed URL content 402, for instance to the exemplary parsed content 1402 of FIG. 5, to extract a possible claimant (step 404), extract subjects and objects (step 406), and create title-claimant and description-claimant pairs (step 408) from text of the parsed URL content 402. The claimant includes the name of an entity (e.g., a person) which makes a particular assertion set forth in the parsed URL content 402.

In an example implementation of step 406, a pre-trained en_core_web_md™ model acquired online from the spaCy™ model repository is applied for extraction of natural language processing ("NLP") features of the parsed URL content 402. Subjects from the text of the parsed URL content 402 are extracted, particularly words that have grammar syntactic dependency of "nominal subject". Objects from the text of the parsed URL content 402 are extracted, particularly words that have grammar syntactic dependency of "direct object", "object" or "object of preposition". Names of entities (e.g., personal names) from the text of the parsed URL content 402 are extracted. For example, words are extracted that have named-entity recognition ("NER") of "PERSON" and are contained in the nltk.corpus.names™ package list of the Natural Language Toolkit™ ("NLTK"™) platform. A list of the extracted subjects and a list of the extracted names are beneficially joined into a list of extended subjects. In a step 410, the keyword pairs 412 to be used for searches are created by taking pairs of a subject and an object in the concatenated text that are spatially close, for example both the subject and the object present in any one of two adjacent sentences of the parsed URL content 402, to create a list of subject-object keyword pairs ("keyword_pair_list").

Keyword pairs 412 are also extracted from content parsed from the "title" and "description" tags of the HTML of the parsed URL content 402. In the step 404, an attempt is made to determine a possible claimant from the HTML title texts and HTML description texts. A claimant includes the name of an individual or group likely to be making statements or allegations in the content being checked for factualness. It can be assumed that the most common name (e.g., personal name) from the title text and the description text is the claimant. In a step 408, a title keyword (from an HTML title) and a description keyword (from an HTML description) are extracted, and the title keyword and the description keyword are used to create a title-claimant keyword pair ("keyword_pair_title") and a description-claimant keyword pair ("keyword_pair_description"), respectively. Keyword pairs extracted from concatenated text, title text, and description text are joined together.

The keyword pairs 412, for example in the form of multi-headed query pairs beneficially include three pair lists. For example, multi-headed query pairs can include one or more title-claimant keyword pairs, one or more description-claimant keyword pairs, and one or more concatenated text keyword pairs. Multi-headed query pairs are advantageous in that they effectively capture the main information of the text, and can be easily parallelized for computational efficiency.

Referring to FIG. 7, exemplary keyword pairs 1412 in the form of multi-headed query pairs derived from the exemplary parsed content 1402 via the multi-headed query extraction process 400 are shown. Shown subject-object keyword pairs ("keyword_pair_list") are based on the concatenated text ("text") of the exemplary parsed content 1402, which keyword pairs are determined as: ("beneficiary", "aid"), ("minister", "right"), ("minister", "government"), ("people", "beneficiary"), and ("people", "right"). A shown title-claimant keyword pair ("keyword_pair_title") is based on the URL title ("title") and a determined claimant of the exemplary parsed content 1402, which keyword pair is determined as: ("William Rudolfo Accuses Bittenger of Preparing to Photograph Financial Aid Beneficiaries", "William Rudolfo"). A shown description-claimant keyword pair ("keyword_pair_description") is based on the URL description ("description") and a determined claimant of the exemplary parsed content 1402, which keyword pair is determined as: ("What we're proposing is unfair", "William Rudolfo").

Referring to FIG. 2, in a step 208, an internet search is conducted based on the determined keyword pairs 412. The internet search can be performed for example via an internet search engine (e.g., Google™, Bing™) or via a search engine enabled on a targeted site (e.g., Snopes.com™, Polygraph.info™). Each keyword pair 412 from the multi-headed query pair determined as described in the process 400 is searched. The search of each keyword pair 412 can be conducted in parallel to speed searching.

The search results generated by the search engine are formatted. Keywords and a summary are extracted from the text of the search results. If a summary is not available, main parts of the text of the search results are extracted. If a claimant of the text of the search results is available, the claimant is extracted also. The URL of each search result where information has been found is stored, which is used for fact check information aggregation and also for displaying to the user.

To speed up a fact check information extraction process described herein, search results can be filtered to include only search results including URLs of known fact check sources (e.g., Snopes.com™, Polygraph.info™) or to include only search results that include some extractable factual information and that come from a news article (e.g., include a URL of a predetermined news source).

Referring to FIG. 8, a hypothetical first exemplary formatted search result 1422 resulting from a hypothetical search of an exemplary indexed database (e.g., a Google™ search) on keyword pairs 412 (e.g., the exemplary keyword pairs 1412) is shown. The first exemplary formatted search result 1422 includes a claim including extracted text which reads "Garoundaland Highway Overseer Gerald Hanover, a governmental ally to Garoundaland Minister Jason Bittenger, ordered Road Service laborers to 'slow the traffic down' to help Bittenger win the 2021 ministerial election." Further included is claim review data indicating a publisher of the text ("Factychecky.com"), a site from which the text originates ("factychecky.com"), a URL of the site of the search result ("https://www.factychecky.com/fact-check/grs-slowing-traffic-Bittenger/"), a title of the claim of the search result ("Is GRS Purposefully Slowing Traffic To Help Reelect Bittenger?"), when the site was accessed and reviewed ("2021-08-06T12:22:00Z"), and an indication of the factualness of the claim ("Unproven").

For the purpose of explanation, the hypothetical first exemplary formatted search result 1422 is considered to result from a hypothetical search of the exemplary keyword pairs 1412. The first exemplary formatted search result 1422 is irrelevant with respect to the parsed content 1402 and the content 1006 of the exemplary webpage 1002 from which the parsed content 1402 is based. This brings attention to step 210 of the method 200 which includes selection of one or more relevant search results. In the step 210 a relevancy and confidence determination process 420 of FIG. 9 is performed.

Referring to FIG. 9, in a step 424, the relevancy and confidence determination process 420 takes formatted search results 422 (e.g., the first exemplary formatted search result 1422) and pre-processes the determined claim of the formatted search results with natural language processing (NLP) methods (e.g., to lemmatize and remove stop words). A claim can be determined in a search result 422 based on detecting quotation marks in content associated of the search result 422. Alternatively, a claim can be determined in a search result based on an explicit indication in content associated with a search result 422, for example an explicit indication on a fact checking site (e.g., Snopes.com™, Polygraph.info™), that particular content corresponds to a claim.

In a step 426, features of the text of the search results are extracted and computed, for example keywords, sentence similarities, subjects of sentences, and objects of sentences. In a step 428, heuristic decision logic is applied to determine if the text of the search results is relevant to produce a relevancy determination 430. In a step 432, a machine learning model is applied to the text of the search results to determine a confidence 434 of the relevancy determination 430. The relevancy and confidence determination process 420 is beneficially performed for all formatted search results 422, which data can be used in tuning and bug fixing in the heuristic decision logic of step 428 or other algorithms used in selection of a relevant search result (step 210). In an alternative implementation, the computation of relevancy confidence 434 can be performed only on the relevancy determinations 430 that indicate that the corresponding formatted search result 422 is relevant. Beneficially, the relevancy and confidence determination process 420 runs in parallel for each formatted search result 422 (excluding filtered out results) that results from searching a particular keyword pair 412.

Referring to FIG. 10A, the heuristic decision logic of step 428 calculates a plurality of heuristic features 436 to produce the relevancy determination 430:

A "vector similarity score" is calculated as a vector of a similarity score, one item for each sentence of the parsed URL content 402 or the original unparsed URL content ("the article"). The similarity score is a representative score of similarity between the sentence in the article of the site accessed and the text of the claim in the formatted search result 422 ("the claim"). The similarity score ranges from 0 to 3. The similarity score is equal to the number of the following met conditions: if the cosine similarity of word embeddings for the article sentence compared to word embeddings of the claim text is higher than 0.85; if the subject of the article sentence is equal to the subject of the claim text; if the object of the article sentence is equal to the object of the claim text.

A "vector sentence similarity" is a vector of cosine similarity of word embeddings, one item for each sentence of the article.

A "total similarity score" is a total number of elements in the vector similarity score that have value equal to 2 or 3.

A "keywords hit ratio" is a number of keywords from the claim text and claimant(s) that are present in the article in a lemmatized form divided by the total number of keywords from the claim text.

A "keywords packed" is a Boolean value indicating if at least 70% of keywords from the claim text are present in any of 3 consecutive sentences.

A "keywords loosely packed" is a Boolean value indicating if 100% of keywords from the claim text are present in any of 30 consecutive sentences.

A "quote ratio" is computed. If the text obtained from the internet search is a quote (indicated by being in parentheses) then the portion of the quote present in the article is computed. The number of consecutive characters is counted and then divided by the number of characters of the quote obtained from the internet search.

Referring to FIG. 10B, a formatted search result 422 is considered relevant to the article if it satisfies one of the following group of heuristic rules 438:

The claim is a result of the "HTML title" ("keyword_pair_title") search and total similarity score >=2 and keywords hit ratio >=0.8

The claim is a result of the "HTML description" ("keyword_pair_description") search and total similarity score >=3 and keywords hit ratio >=0.8

The claim is a quote and keywords packed=true and total similarity score >=2 and keywords hit ratio >=0.9

The claim is a quote and keywords loosely packed=true and maximum vector similarity score==3

The claim is a quote and keywords packed=true and maximum vector similarity score >=2 and maximum vector sentence similarity >=0.9

The claim is a quote and quote ratio >=0.80

Keywords packed=true and total similarity score >=2 and keywords hit ratio >=0.9

Maximum vector sentence similarity >=0.97

Referring to FIG. 11, a hypothetical second exemplary formatted search result 2422 is shown. For the purpose of explanation, the second exemplary formatted search result 2422 is considered to result from a hypothetical search of the exemplary keyword pairs 1412, and the second exemplary formatted search result 2422 is determined to be relevant to the exemplary parsed content 1402 and the URL content 1006 of the exemplary webpage 1002 of the screen capture 1000. The second exemplary formatted search result 2422 is presented as a claim including extracted text which reads "First of all, what we're proposing is unfair. I realize that's not a word they typically use in governments, but it's unfair. See what he's proposing right—see what this minister's proposing right now. See what people have tried previously. They're going to photograph financial aid beneficiaries." Also included is a claimant ("William Rudolfo") and a claim date stamp ("2021-03-20T00:00:00Z"). Further included is claim review data indicating a publisher of the text ("Rickstown Times"), a domain name of the site ("rickstowntimes.com"), a URL of the search result ("https://www.rickstowntimes.com/governments/2021/03/12/Rudolfo-falsely-accuses-bittenger-over-financial-aid-policy-suggested-by-rigel/"), a title of the search result ("Analysis|Rudolfo falsely accuses Bittenger over a financial aid policy . . . "), and an indication of the factualness of the claim ("False").

Referring FIG. 12, exemplary features and exemplary calculated intermediate results 2440 of the claim of the second exemplary formatted search result 2422 of FIG. 11 as compared to the exemplary parsed content 1402 are shown. The exemplary features and exemplary calculated intermediate results 2440 define: a query type as "description", a query text as "William Rudolfo 'What we're proposing is unfair'", a decision of whether the claim is a quote as "True", lemmatized claim text as "unfair realize word use governments unfair See right see minister right See people going photograph financial aid beneficiaries", and claim keywords as "William", "Rudolfo", "minister", "people", "government", "beneficiary", "right", "see", "realize", and "go". The exemplary features and exemplary calculated intermediate results 2440 further define a vector sentence similarity as [0.71, 0.63, 0.78, 0.69, 0.28], a vector similarity score as [0, 1, 2, 1, 1], a total similarity score as 1, a keywords hit ratio as 1.0, a keywords packed decision as "True", a keywords loosely packed decision as "False", a quote ratio as 1.0, a relevant decision as "True", and a confidence calculation as 0.49.

In the step 432 for computing confidence 434 of the relevancy determination 430, the weight of a search result 422 for fact checking (i.e., how relevant a search result 422 for fact checking is for a given article represented by parsed URL content 402) is beneficially calculated by a combination of two scores: a first score calculated by an agreement aggregation with other search results, and a second score calculated from the heuristic features 436 and the heuristic rules 438.

In calculating the first score (an "aggregated agreement score"), agreement aggregated fact scoring is performed. First, an agreement classification is conducted among the search results, in other words, how much each search result 422 is in agreement with other results. Comparison of the search results can be performed based on the heuristic features 436 and the heuristic rules 438 and based on comparison of extracted claimants and extracted claims of search results 422.

An agreement matrix is generated based on the comparison of the search results 422, which agreement matrix can be represented for example as a symmetric Toeplitz matrix with the dimensions equal to the number of search results 422. Then, the search results 422 are clustered based on the agreement matrix with a known clustering method such as t-Distributed Stochastic Neighbor Embedding ("t-SNE"). Outliers are removed and the clusters are back linked with the search results 422 that were classified as relevant in the relevancy determination of step 428.

In an example implementation, for each search result 422, a set of heuristic features 436 can be established. A table is generated including rows corresponding to the search results 422 and columns corresponding to the extracted heuristic features 436. The columns including the heuristic features 436 are beneficially generated for example to include a possible claimant, keywords of text, quotes in the text, and number of sentences. A data analyzing method for dimensionality reduction such as t-SNE or Uniform Manifold Approximation and Projection ("UMAP") is applied to reduce the number of columns of the table to two, without affecting the rows which still correspond to the search results. These two newly created columns can be represented as x and y coordinates. Clusters are formed of coordinates that are close to each other. It may happen that for example rows "1", "2" and "4" are close to each other and hence make a cluster. And since the dimensionality reduction does not affect the rows, we know that search results "1", "2" and "4" are similar. Agreement scores between search results are generated based on search result similarities to populate the agreement matrix.

The first score for the determination in step 432 of the confidence 434 of the relevancy determination 430 of a search result 422 for fact checking is an aggregated agreement score which is calculated from the agreement matrix populated based on the described clustering method. The aggregated agreement score for a particular search result 422 can be calculated based on a row associated with a particular search result 422. Referring to Table 1 below, an example agreement matrix is shown including example indications of search results 422 in the form of a hypothetical search result A, a hypothetical search result B, and a hypothetical search result C and their corresponding agreement scores with each other. An aggregated agreement score for search result A is calculated based on the agreement matrix as shown in Equation 1.

TABLE 1

| Agreement with other results | search result A | search result B | search result C |
| --- | --- | --- | --- |
| search result A | 1.0 | 0.2 | 0.8 |
| search result B | 0.2 | 1.0 | 0.4 |
| search result C | 0.8 | 0.4 | 1.0 |

$$\text{Aggregated Agreement Score of Search Result } A = 1 - (1-0.2)\cdot(1-0.8) = 0.84 \quad \text{Equation 1}$$

The second score used for the determination in step 432 of the confidence 434 of the relevancy determination 430 of a search result 422 for fact checking is based on heuristic rules. The second score represents accuracy of the heuristic rules (e.g., the heuristic rules 438) used in determining relevancy in step 428. The second score is beneficially calculated with a logistic regression machine learning ("ML") model.

The ML model can quantify the heuristic rules into a number which represents the confidence. The ML model permits learning from data instead of assigning the weights to each heuristic rule based on predetermined assumptions. Another benefit of the ML model is that contrary to heuristic rules that provide only a binary decision: relevant/not relevant, the ML model provides a fuzzy value which can be used for fine-tuning the ML model by setting a threshold for deciding if claims of search results 422 are relevant. The input to the ML model can include values of the heuristic features 436 and the output is beneficially scaled to give a result between 0 and 1. For training, hand or machine labeled data for a plurality of URLs (e.g., forty (40) URLs) can be provided.

Claims included in search results associated with a high first score ("aggregated agreement score") are considered likely to be factual. Claims included in search results associated with a high first score ("aggregated agreement score") and a high second score (based on the ML model) are considered more likely to be factual. Claims included in search results associated with a low first score ("aggregated agreement score") are considered less likely to be factual. Claims, included in search results 422 of a search based on keyword pairs 412, that are determined likely to be factual and determined to be relevant in step 428 can be used in providing a notification to a user indicating that the article on which the keyword pairs 412 are based is factual. Claims, included in search results 422 of a search based on keyword pairs 412, that are determined not likely to be factual and determined to be relevant in step 428 can be used in providing a notification to a user indicating that the article on which the keyword pairs 412 are based is not factual.

Figure 13A:
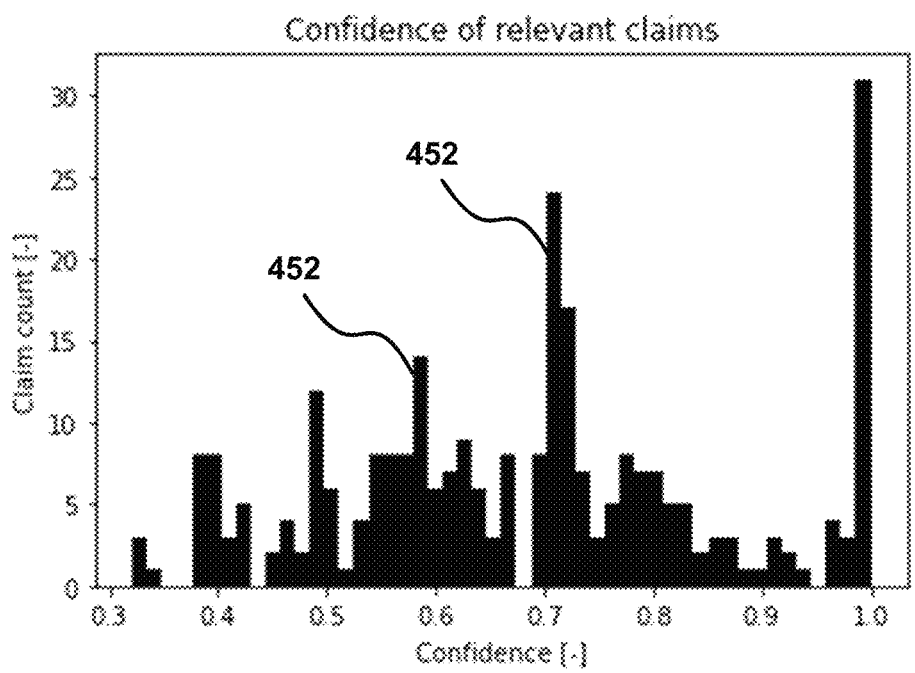
FIGS. 13A and 13B are exemplary histogram of confidences of claims of exemplary search results.
Figure 13B:
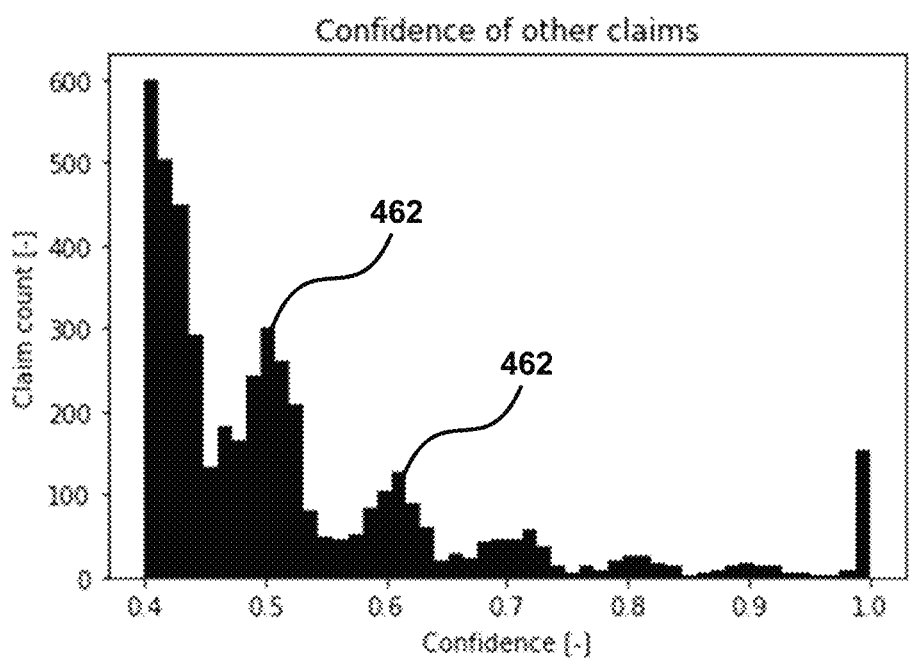

Referring to FIG. 13A a first exemplary histogram of confidences 452 of claims of exemplary search results 422 determined to be relevant in step 428 is shown, the exemplary search results 422 stemming from an exemplary search based on exemplary keyword pairs 412. Referring to FIG. 13B a second exemplary histogram of confidences 462 of claims of the exemplary search results 422 determined to be not relevant in step 428. The confidences 452 of claims determined to be relevant are shown to be generally higher than the confidences 462 of the non-relevant claims supporting the accuracy at predicting relevancy of the heuristic rules 438. Claims determined to be relevant in step 428 but having a low confidence as determined in step 432 can be discarded. Further, claims determined to be not relevant in step 428 but having a high confidence as determined in step 432 can be retained.

Temporal monitoring of network locations for information related to analyzed articles is enabled (step 212) by the evaluation manager 20 and the evaluation agent 16. After search results are produced from searches of the multi-headed queries for an article, the following information are stored in a database: the URL of the article, the multi-headed queries for the article including keyword pairs 412, and the results produced from searches of the multi-headed queries for the article including formatted search results 422, which database can include one or more of the intelligence datastore 24 or a user datastore 26 of the evaluation manager 20 or the local datastore 54 of the computing device 12. Each query is linked to the article from which the keyword pairs 412 were extracted. By keeping this information, it can be detected whether new information appears and changes the determination of factualness of the article from which the keyword pairs 412 were extracted (e.g., invalidates the article).

If a keyword pair 412 already exists in the database, new search results are added to the agreement matrix of related search results and corresponding content. If new information agrees with the previous search results in the agreement matrix, then there are no updates to the scores of search results and corresponding content. Alternatively, if new information does not agree with the previous search results in the agreement matrix, then it will lower the score of the previous search results and corresponding content and the database will be updated. Articles are not determined to be false based on just one contradicting result but rather the factualness of an article can be determined to decline over time if more and more facts do not agree with a previous determination of factualness. Further, the factualness of an article can be determined to increase over time if more and more facts do agree with a previous determination of factualness. It is therefore possible to track how information changes and to keep users informed that there are contradictions in the older articles.

The evaluation manager 20 is further enabled to track a total factualness for a whole website including a plurality of webpages with a plurality of articles enabled by one or more web/app servers 40. The factualness of a website can be calculated using weighted mean where weights are lower (e.g., exponentially lower) for older articles on the website. For example, if there is a particular article (e.g., non-factual article) posted on a website in the distant past, the particular article will not have as great an influence on a factualness score of the website as newer articles (e.g., factual articles) on the website.

Trustfulness of network located fact checking sources included in the search results 422 is calculated for the purpose of weighting search results 422. If a source included in a search result 422 often disagrees with the majority of other network located sources it will have the lower overall weight score. The weight score of the sources is used when calculating the confidence in step 432.

Figure 3B:
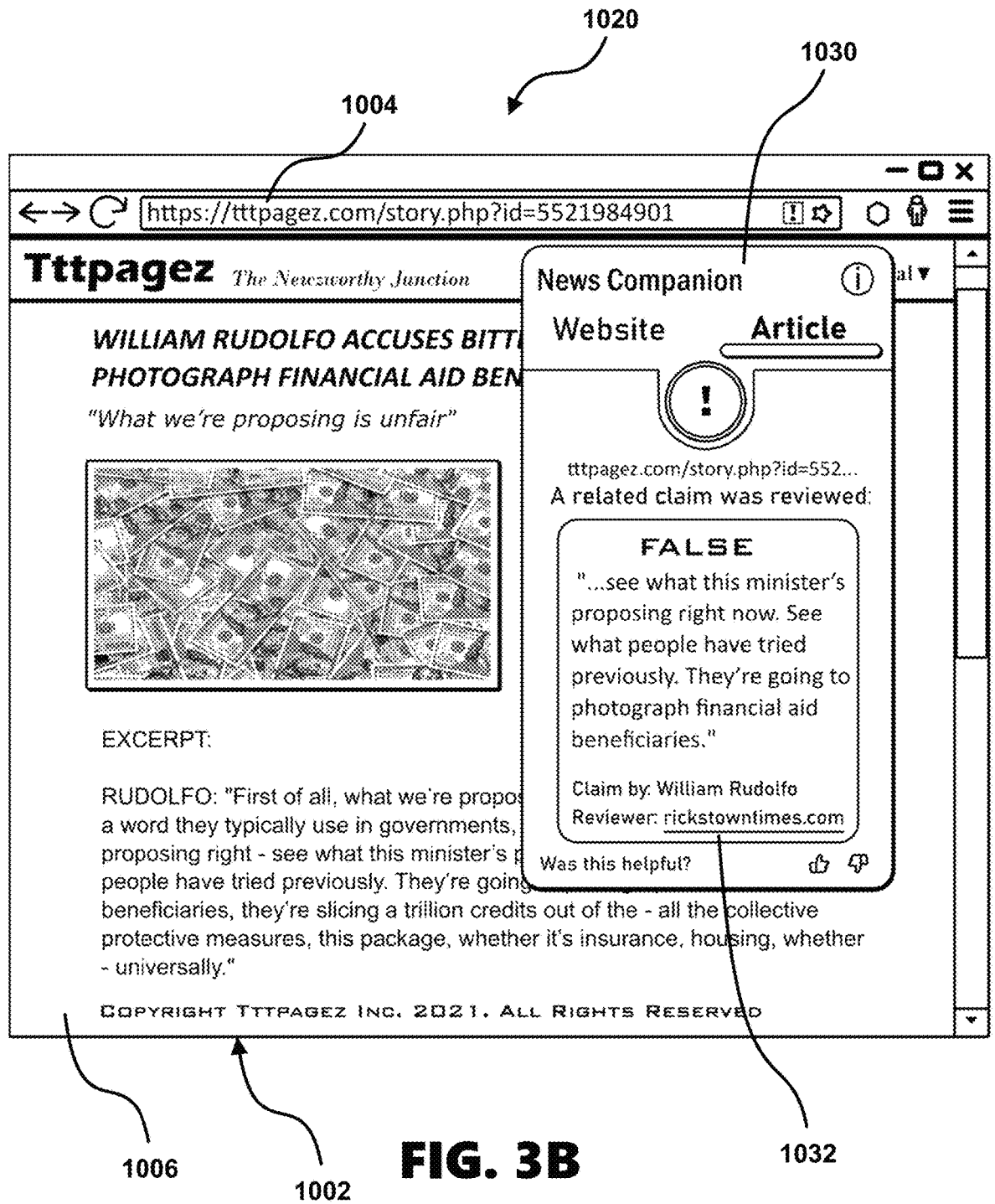
FIG. 3B shows another webpage browser window screen capture of the exemplary webpage of FIG. 3A including a factualness notice.
Figure 4A:
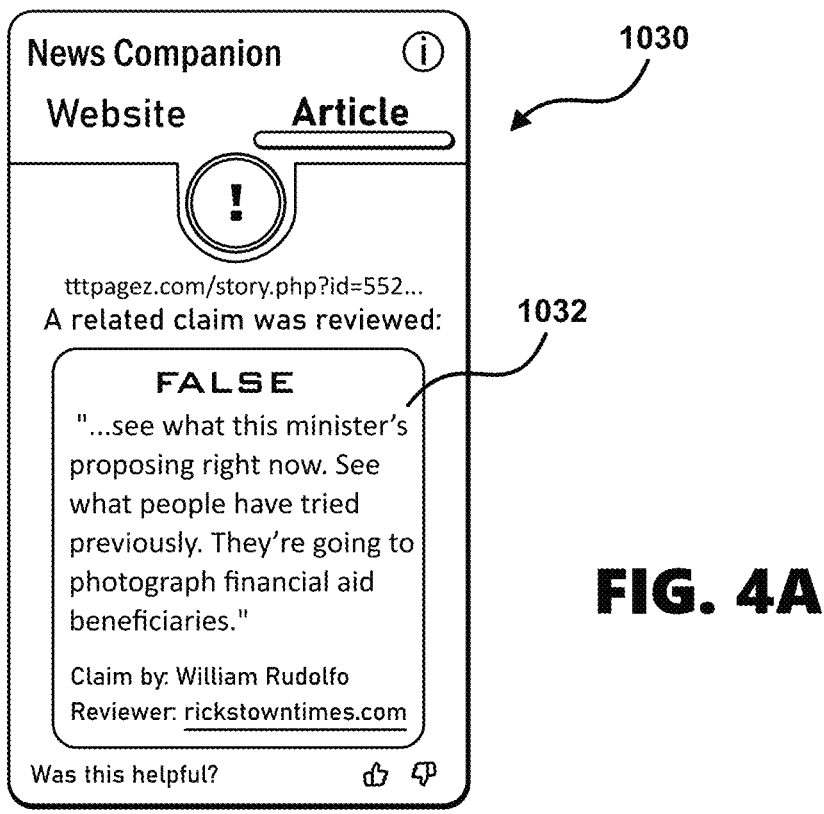
FIGS. 4A-4E are hypothetical exemplary factualness notices.
Figure 4B:
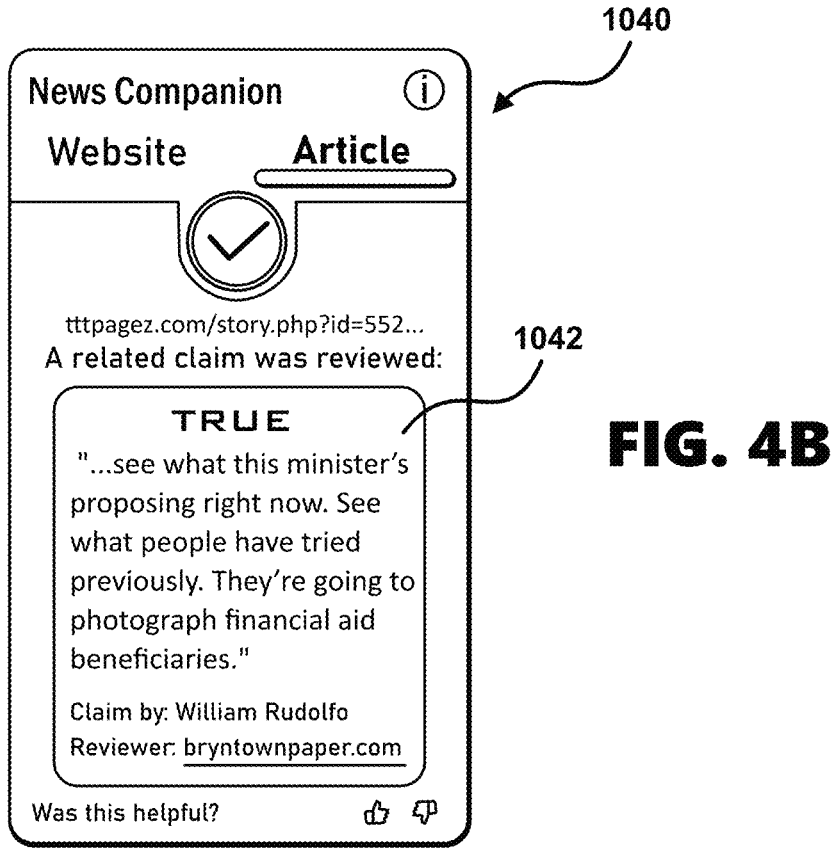
Figure 4C:
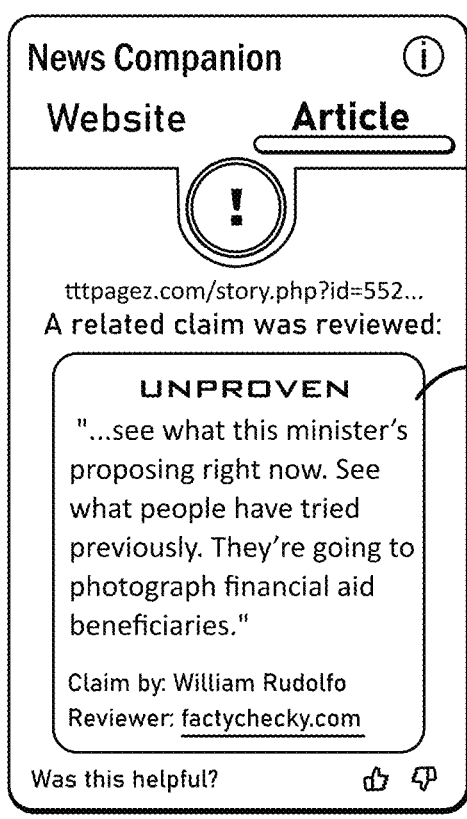
Figure 4E:
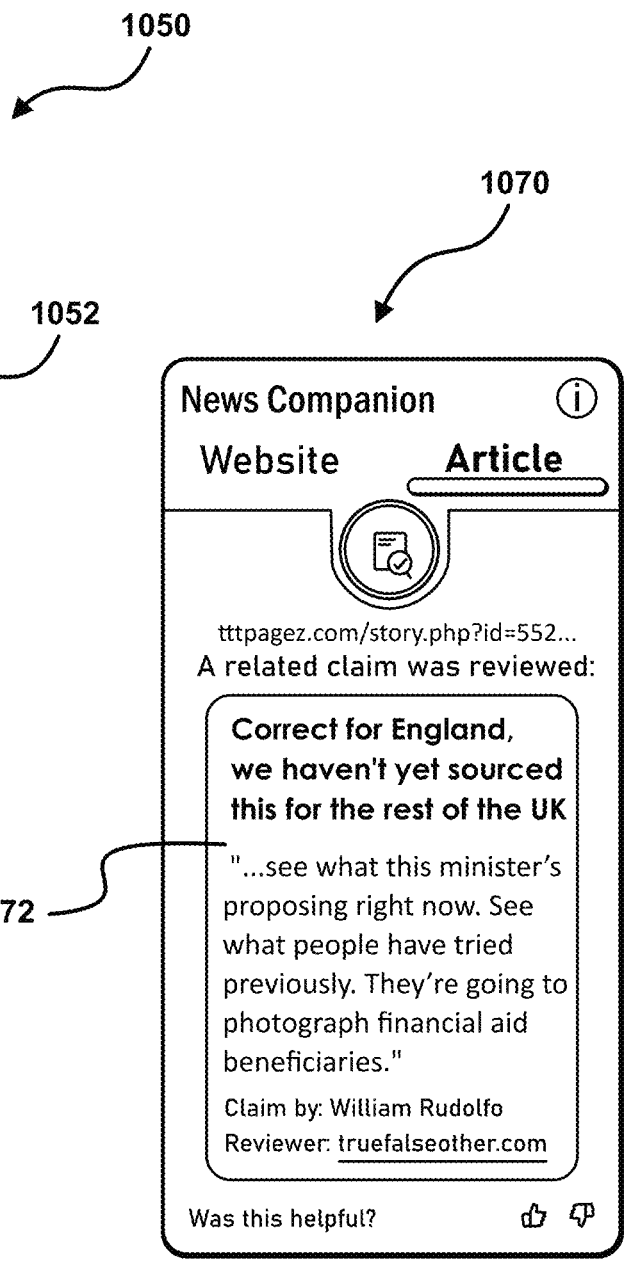
Figure 4D:

Referring to FIGS. 3B and 4A, a second webpage browser window screen capture 1020 of the exemplary webpage 1002 is shown. The exemplary URL is shown in the browser window address bar 1004, and the webpage 1002 includes the content 1006. A first example factualness notice 1030 is provided based on a plurality of search results 422 including the second example formatted search result 2422 of an example search performed on the keyword pairs 1412 based on the parsed content 1402 based on the URL content 1006 of the exemplary webpage 1002. The factualness notice 1030 includes a first example factualness assertion 1032 based at least on the content of the second example formatted search result 2422 and a relevancy determination 430 performed for the formatted search result 2422. The factualness assertion 1032 asserts that a claim related to the content 1006 is false. Beneficially, the first example factualness assertion 1032 is also based on one or more confidence decisions 434 respectively associated with the one or more relevancy determinations 430.

In providing a notice such as the factualness notice 1030, beneficially, a plurality of search results 422 based on a plurality of searches of parsed URL content 402 (e.g., the exemplary parsed content 1402) are aggregated. A plurality of relevancy determinations 430 are calculated and respective confidence 434 are calculated. Based on the relevancy determinations 430 and the respective confidence 434 the decision included in a factualness assertion is achieved, for example the "false" indication in the first example factualness assertion 1032. One of the plurality of search results 422 is chosen as representative of the aggregated search results and indicated by domain name associated with the URL of the representative search result, for example "rickstowntimes.com" in the first example factualness assertion 1032.

Referring to FIGS. 4B through 4E alternative example factual notices are shown. A second example factualness notice 1040 includes a second example factualness assertion 1042 asserting the truth of a claim related to the content 1006 based on content of one or more formatted search results 422 and respective one or more relevancy determinations 430 performed on one or more search results 422. Beneficially, the second example factualness assertion 1042 is also based on one or more confidence decisions 434 respectively associated with the one or more relevancy determinations 430.

A third example factualness notice 1050 includes a third example factualness assertion 1052 asserting the unproven nature of a claim related to the content 1006 based on content of one or more formatted search results 422 and respective one or more relevancy determinations 430 performed on one or more search results 422. Beneficially, the third example factualness assertion 1052 is also based on one or more confidence decisions 434 respectively associated with the one or more relevancy determinations 430.

A fourth example factualness notice 1060 includes a fourth example factualness assertion 1062 asserting that no claims related to the content 1006 have been found based on content of one or more formatted search results 422 and respective one or more relevancy determinations 430 performed on the one or more formatted search results 422. Beneficially, the fourth example factualness assertion 1062 is also based on one or more confidence decisions 434 respectively associated with the one or more relevancy determinations 430.

A fifth example factualness notice 1070 includes a fifth example factualness assertion 1072 asserting a claim related to the content 1006 is true based on content of one or more formatted search results 422 originating from a particular locality ("England") and respective one or more relevancy determinations 430 performed on one or more search results 422, but that search results 422 originating from outside the particular locality ("rest of the UK") have not yet been sourced. Beneficially, the fifth example factualness assertion 1072 is also based on one or more confidence decisions 434 respectively associated with the one or more relevancy determinations 430.

Figure 14:
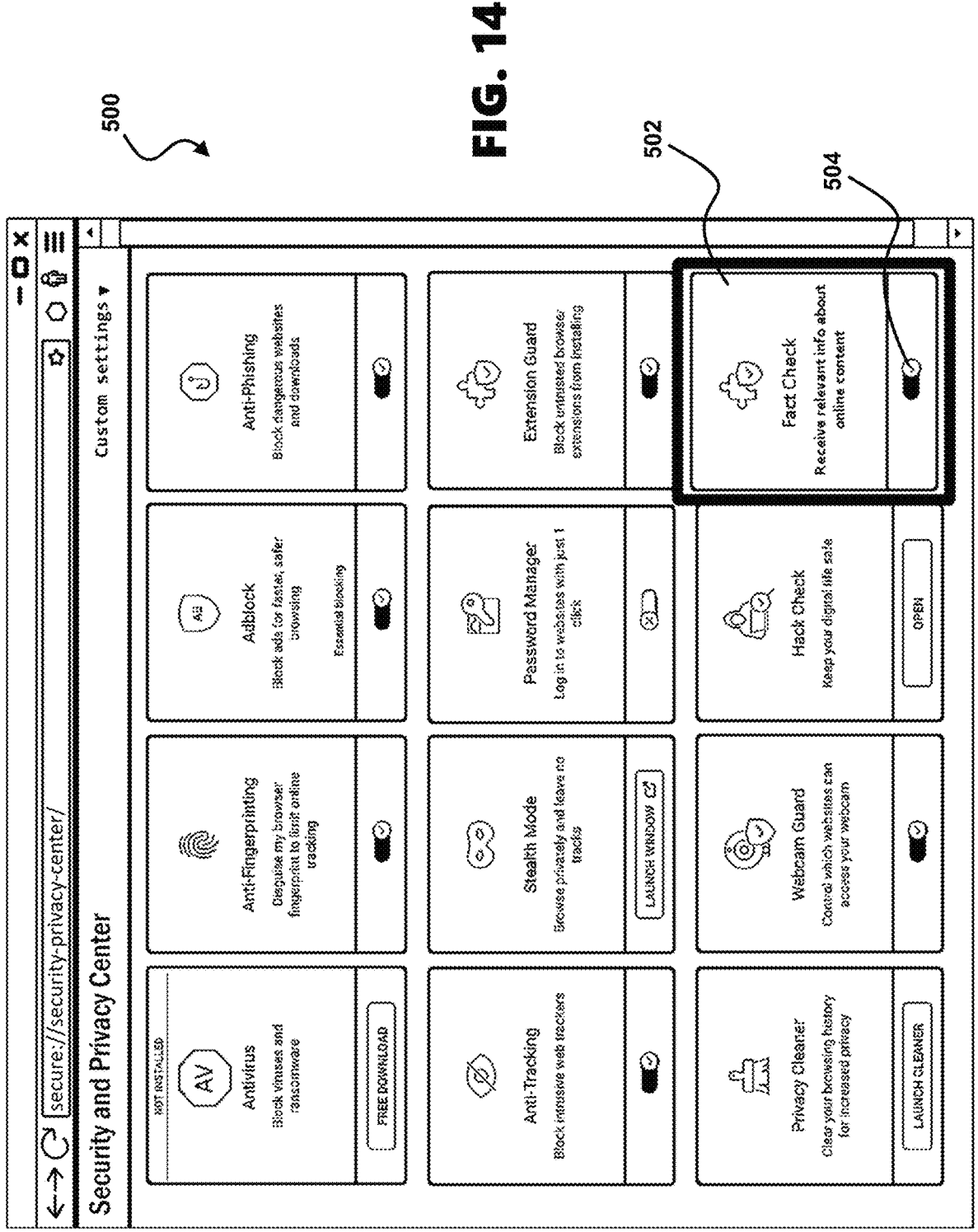
FIG. 14 shows a security module selection browser window enabled by a browser in a user interface of a computing device according to illustrative embodiments.

Referring to FIG. 14, an exemplary security module selection browser window 500 is shown which is enabled by a browser 50 within the user interface 58 of a computing device 12. The security module selection browser window 500 enables selection by a user of a plurality of security features for use integral with the browser 50. The evaluation agent 16 is enabled as an extension in the browser 50 by a user's actuation of a toggle switch 504 on a fact check module 502 displayed among other modules in the security module selection browser window 500 and indicating a feature including "receive relevant info about online content".

Figure 15:
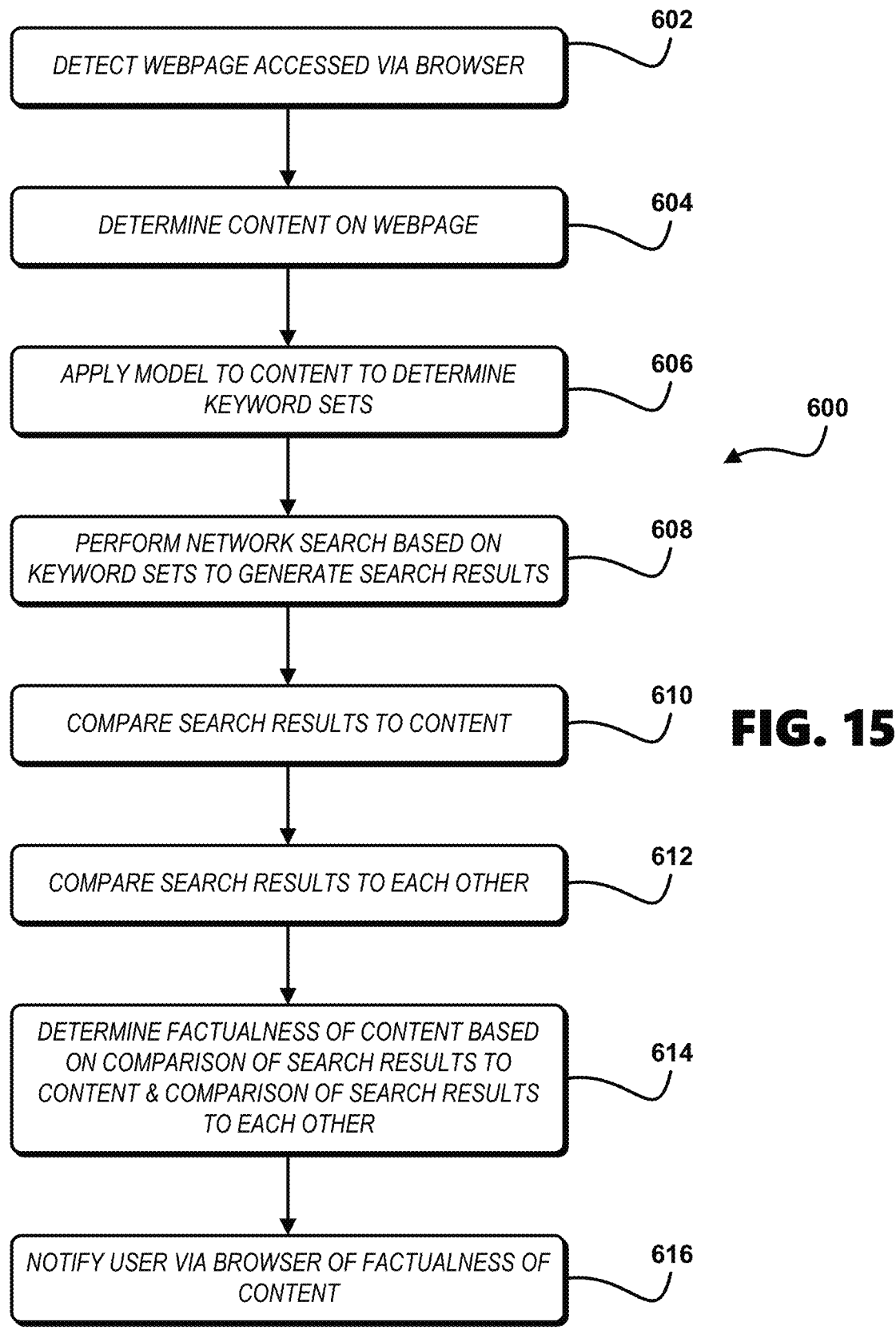
FIG. 15 is a diagram showing a method of notifying a browser user of content factualness.

Referring to FIG. 15, a method 600 of notifying a browser user of content factualness is shown. The method 600 is described with reference to the components of the system 10, including the evaluation manager 20, computing device 12, evaluation agent 16, and browser 50. Alternatively, the method 600 can be performed via other systems and is not restricted to being implemented by the so described components.

A step 602 of the method 600 includes detecting a webpage accessed by a user on a computing device via a browser. Content on the webpage is determined (step 604). Determining the content on the webpage can include for example determining text on the webpage. A model is applied to the content to determine a plurality of keyword sets (step 606).

The plurality of keyword sets can include a plurality of keyword pairs. For instance, the content can include a plurality of sentences including text, and applying the model to the content to determine the plurality of keyword sets can include extracting a plurality of subjects from the sentences, extracting a plurality of objects from the sentences, and generating the plurality of keyword pairs based on the plurality of subjects and the plurality of objects. Further, a plurality of names can be extracted from the sentences, and the plurality of keyword pairs can be generated further based on the plurality of names. Generating the plurality of keyword pairs can include determining a plurality of subject-object word pairs, each of the plurality of subject-object word pairs including a particular sentence subject and a particular sentence object present in one or more of the plurality of sentences. Further, generating the plurality of keyword pairs can include determining a plurality of subject-object word pairs, each of the plurality of subject-object word pairs including a particular sentence subject in one or more of two adjacent sentences of the plurality of sentences and a particular sentence object present in one or more of the two adjacent sentences of the plurality of sentences.

The webpage detected at step 602 can include a Hyper Text Markup Language ("HTML") title and an HTML description, and the method 600 can further include determining a particular keyword set of the plurality of keyword sets based on one or both of the HTML title or the HTML description. The method 600 can further include determining a claim of the one or both of the HTML title or the HTML description, determining a claimant of the claim, and determining the particular keyword set to include the claim and the claimant. The method 600 can further include determining a most common personal name in the one or both of the HTML title or the HTML description, and determining the claimant to be the most common personal name in the one or both of the HTML title or the HTML description.

A network search is performed based on each of the plurality of keyword sets to generate a plurality of search results (step 608). Performing the network search can include initiating a search of an indexed database. Further the network search of two or more of the plurality of keyword sets can be performed in parallel. The plurality of search results are compared to the content (step 610), and the plurality of search results are compared to each other (step 612). The plurality of search results can be compared to the content in parallel with comparing the plurality of search results to each other.

A factualness of the content is determined based on the comparing of the plurality of search results to the content and based on the comparing of the plurality of the search results to each other (step 614). A relevancy of the search results can be determined based on the comparing of the plurality of search results to the content, a confidence of the search results can be determined based on the comparing of the plurality of search results to each other, and the factualness of the content can be determined based on the relevancy of the search results and the confidence of the search results. For instance, the relevancy of the search results can be determined to exceed a particular relevancy threshold, and the plurality of search results can be compared to each other based on determining the plurality of search results exceed the particular relevancy threshold. The user is notified via the browser of the factualness of the content (step 616). Beneficially, the user is notified via a notification in a window which obscures at least a portion of the content of the webpage.

Determining the content in step 604 on the webpage in step 604 can include determining a plurality of sentences, and the plurality of search results can indicate a plurality of network locations including one or more claims including claim text. Comparing the plurality of search results to the content in step 610 can include comparing the claim text of each of the one or more claims to each of the plurality of sentences to determine a plurality of similarities, and the factualness can be determined in step 614 based on the plurality of similarities. The method 600 can further include generating word embeddings of the plurality of sentences and word embeddings of the claim text, wherein comparing the plurality of search results to the content includes comparing the word embeddings of each of the plurality of sentences to the word embeddings of the claim text of a particular claim of the one or more claims. The method 600 can further include determining a plurality of cosine similarities based on the comparing of the word embeddings of each of the plurality of sentences to the word embeddings of the claim text, and determining the factualness based on the plurality of cosine similarities.

The method 600 can further include for each particular claim of the one or more claims for each particular sentence of the plurality of sentences: generating word embeddings of the particular sentence, generating word embeddings of the claim text of the particular claim, determining a particular subject of the particular sentence, determining a particular object of the particular sentence, determining a particular subject of the particular claim, determining a particular object of the particular claim, comparing the word embeddings of the particular sentence to the word embeddings of the claim text of the particular claim to determine a word embedding similarity, comparing the particular object of the particular sentence to the particular object of the particular claim to determine an object similarity, and comparing the particular subject of the particular sentence to the particular subject of the particular claim to determine a subject similarity. And the factualness is determined based on the word embedding similarity, the object similarity, and the subject similarity of each particular claim of the one or more claims for each particular sentence of the plurality of sentences.

The method 600 can further include identifying a plurality of keywords in the one or more claims, determining a number of the plurality keywords identified in the one or more claims that are in each of the plurality of sentences, and determining the factualness based on the number of the plurality keywords in each of the plurality of sentences. Further, the factualness can be determined based on the number of the plurality keywords identified in a particular claim of the one or more claims in each of the plurality of sentences as compared to the number of keywords identified in the particular claim. Further, the factualness can be determined based on the number of the plurality keywords identified in a particular claim of the one or more claims in a particular number of consecutive sentences of the plurality of sentences as compared to the number of keywords in the particular claim.

The method 600 can further include determining the claim text of a particular claim of the one or more claims includes a quote, determining at least a portion of the quote is present in one or more of the plurality of sentences, and determining the factualness of the content based on the portion of the quote is present in the one or more of the plurality of sentences. In a particular implementation, the method 600 can include detecting quotation marks to detect the one or more claims, at least a portion of the one or more claims located within the quotation marks.

The plurality of search results determined in step 608 can include text, and the method 600 can further include comparing the text of each of the plurality of search results to one or more others of the plurality of search results to determine a plurality of agreement scores, and determining the factualness of the content based on the plurality of agreement scores. A matrix can be generated based on the plurality of agreement scores, an aggregated agreement score of one or more of the plurality of search results can be determined based on the matrix, and the factualness of the content can be determined based on the aggregated agreement score of the one or more of the plurality of search results.

In a case where the plurality of search results determined in step 608 include text, the method 600 can further include determining one or more relevant results based on the comparing of the plurality of search results to the content, comparing the text of each of the plurality of search results to one or more others of the plurality of search results to determine a plurality of agreement scores, generating a matrix based on the plurality of agreement scores, determining an aggregated agreement score of one or more of the plurality of search results based on the matrix, and determining the factualness of the content based on the aggregated agreement score of the one or more of the plurality of search results.

Figure 16:
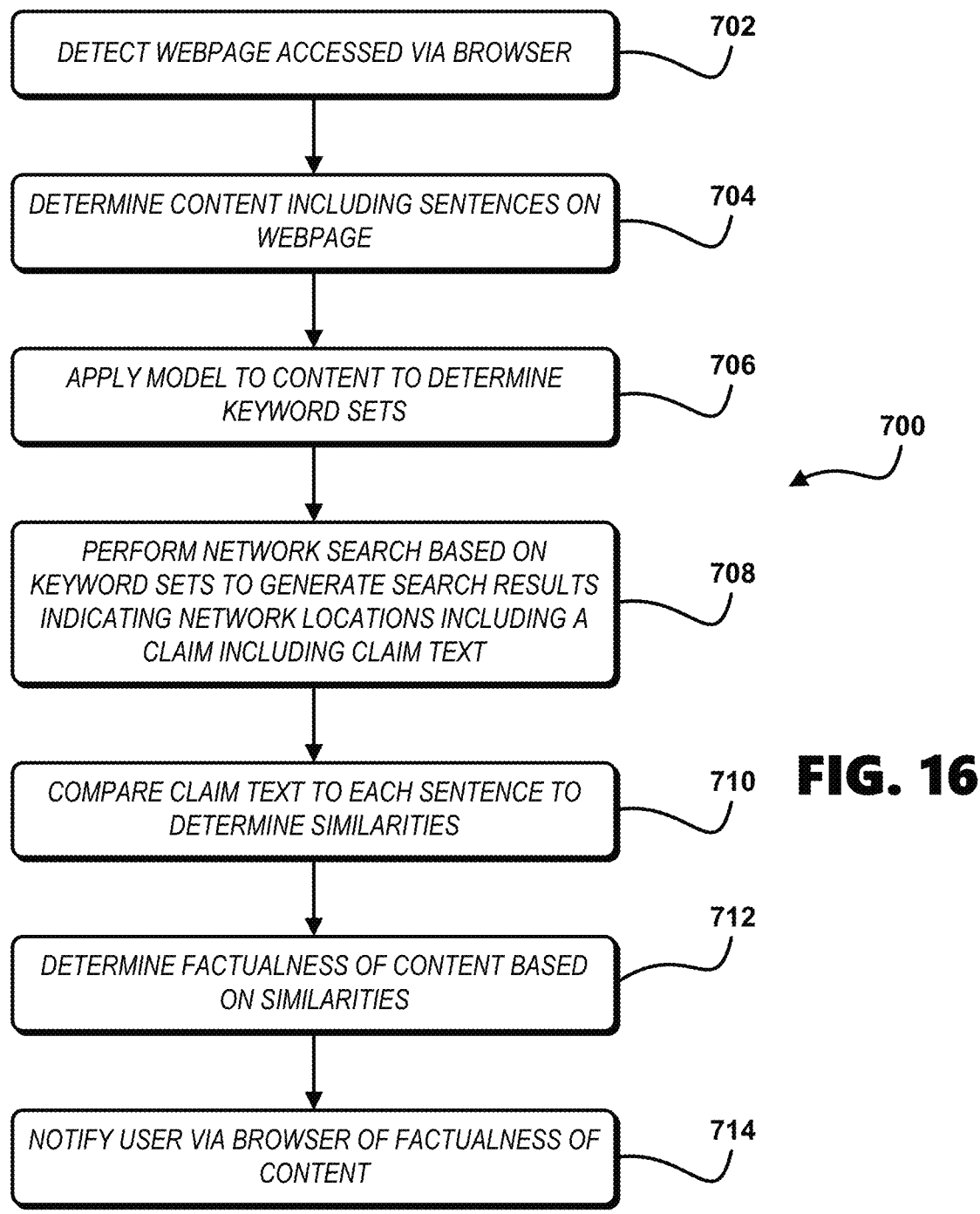
FIG. 16 is a diagram showing another method of notifying a browser user of content factualness.

Referring to FIG. 16, another method 700 of notifying a browser user of content factualness is shown. The method 700 is described with reference to the components of the system 10, including the evaluation manager 20, computing device 12, evaluation agent 16, and browser 50. Alternatively, the method 700 can be performed via other systems and is not restricted to being implemented by the so described components.

A step 702 of the method 700 includes detecting a webpage accessed by a user on a computing device via a browser. Content including a plurality of sentences on the webpage is determined (step 704). A model is applied to the content to determine a plurality of keyword sets (step 706). A network search is performed based on each of the plurality of keyword sets to generate a plurality of search results indicating a plurality of network locations including one or more claims including claim text (step 708). Quotation marks can be detected in one or more of the plurality of search results to detect the one or more claims, at least a portion of the one or more claims located within the quotation marks in the one or more of the plurality of search results. The claim text of each of the one or more claims is compared to each of the plurality of sentences to determine a plurality of similarities (step 710). A factualness of the content is determined based on the plurality of similarities (step 712), and the user is notified via the browser of the factualness of the content (step 714).

Word embeddings of the plurality of sentences and word embeddings of the claim text can be generated, wherein comparing the claim text of each of the one or more claims to each of the plurality of sentences includes comparing the word embeddings of each of the plurality of sentences to the word embeddings of the claim text of a particular claim of the one or more claims. A plurality of cosine similarities can be determined based on the comparing of the word embeddings of each of the plurality of sentences to the word embeddings of the claim text, and the factualness can be determined based on the plurality of cosine similarities.

The method 700 can further include for each particular claim of the one or more claims for each particular sentence of the plurality of sentences: generating word embeddings of the particular sentence, generating word embeddings of the claim text of the particular claim, determining a particular subject of the particular sentence, determining a particular object of the particular sentence, determining a particular subject of the particular claim, determining a particular object of the particular claim, comparing the word embeddings of the particular sentence to the word embeddings of the claim text of the particular claim to determine a word embedding similarity, comparing the particular object of the particular sentence to the particular object of the particular claim to determine an object similarity, and comparing the particular subject of the particular sentence to the particular subject of the particular claim to determine a subject similarity. And the factualness can be determined based on the word embedding similarity, the object similarity, and the subject similarity of each particular claim of the one or more claims for each particular sentence of the plurality of sentences.

Figure 17:
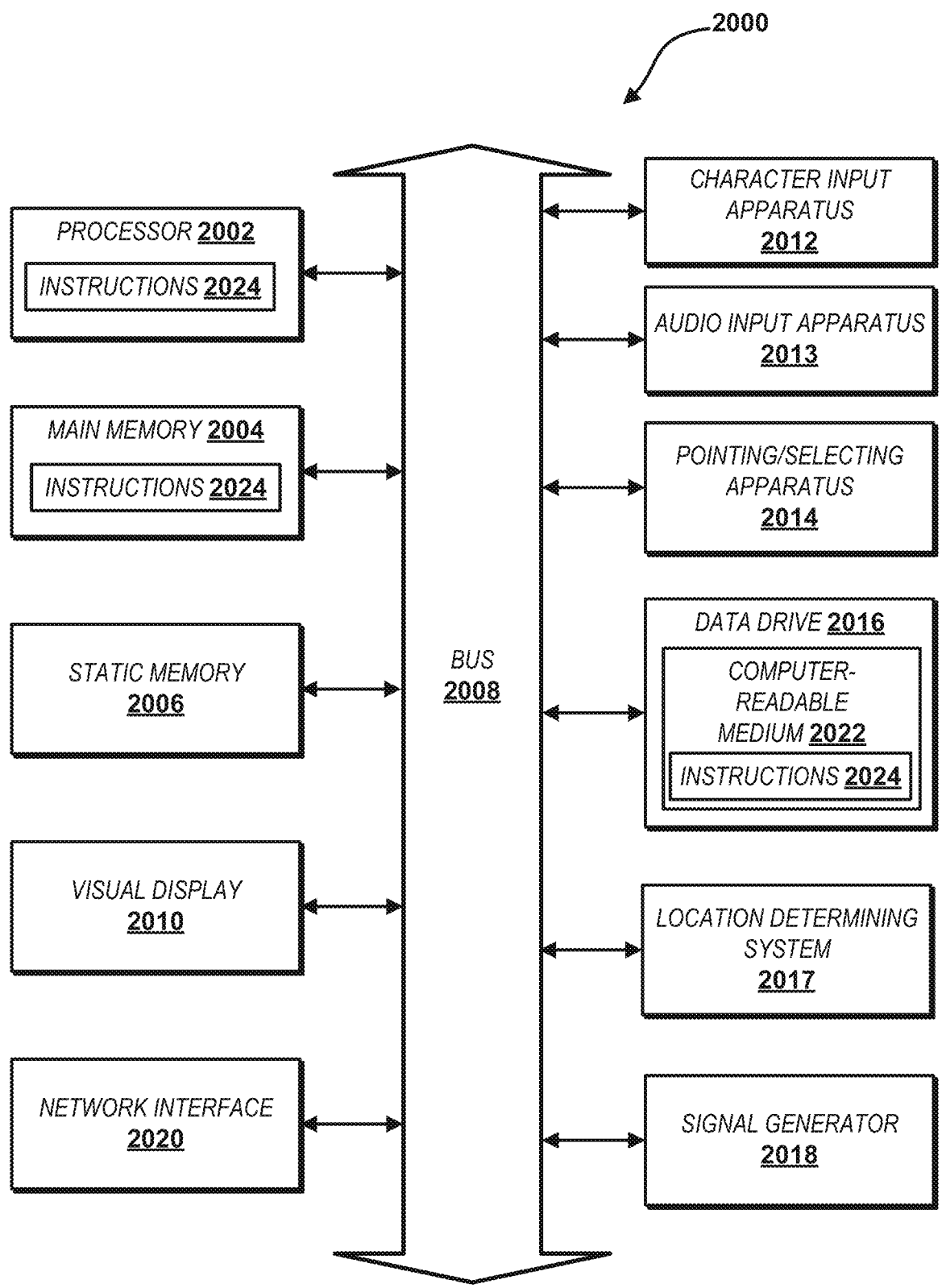
FIG. 17 shows a computer system for performing described methods according to illustrative embodiments.

FIG. 17 illustrates in abstract the function of an exemplary computer system 2000 on which the systems, methods and processes described herein can execute. For example, the computing device 12, evaluation manager 20, and the web/app servers 40 can each be embodied by a particular computer system 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method comprising:
   detecting a webpage accessed by a user on a computing device via a browser;
   determining content on the webpage, the content comprising a plurality of sentences comprising first text;
   applying a first model to the content to determine a plurality of keyword sets;
   performing a network search based on each of the plurality of keyword sets to generate a plurality of search results, the plurality of search results indicating a plurality of network locations comprising at least one claim comprising second text;
   receiving a plurality of data for a plurality of universal resource locators ("URLs") and a plurality of labels for the plurality of data;
   training a second model based on the plurality of data for the plurality of URLs and the plurality of labels for the plurality of data;
   comparing the plurality of search results to the content, the comparing of the plurality of search results to the content comprising:
      generating word embeddings of the plurality of sentences and word embeddings of the second text; and
      comparing the word embeddings of the plurality of sentences to the word embeddings of the second text of the at least one claim;
   comparing the plurality of search results to each other, the comparing of the plurality of search results to each other comprising:
      comparing the second text of at least one of the plurality of search results to others of the plurality of search results to determine a plurality of agreement scores;
      generating a matrix based on the plurality of agreement scores; and
      determining a first score of at least one of the plurality of search results based on an aggregating of the plurality of agreement scores based on the matrix;
   determining a plurality of values based on the comparing the plurality of search results to the content;
   applying the second model to the plurality of values to determine a second score of the at least one of the plurality of search results;
   determining a factualness of the content at least based on the comparing of the word embeddings of the plurality of sentences to the word embeddings of the second text of the at least one claim, based on the first score of the at least one of the plurality of search results, and based on the second score of the at least one of the plurality of search results; and
   notifying the user via the browser of the factualness of the content.

2. The method of claim 1, further comprising:
   determining a relevancy of the search results based on the comparing of the plurality of search results to the content;
   determining a confidence of the search results based on the comparing of the plurality of search results to each other; and
   determining the factualness of the content based on the relevancy of the search results and the confidence of the search results.

3. The method of claim 2, further comprising:
   determining the relevancy of the search results exceed a particular relevancy threshold; and
   comparing the plurality of search results to each other based on determining the plurality of search results exceed the particular relevancy threshold.

4. The method of claim 1, wherein determining the content on the webpage comprises determining the first text.

5. The method of claim 1, wherein the plurality of keyword sets comprise a plurality of keyword pairs.

6. The method of claim 5, wherein applying the first model to the content to determine the plurality of keyword sets comprises:
   extracting a plurality of subjects from the sentences;
   extracting a plurality of objects from the sentences; and
   generating the plurality of keyword pairs based on the plurality of subjects and the plurality of objects.

7. The method of claim 6, further comprising:
   extracting a plurality of names from the sentences; and
   generating the plurality of keyword pairs further based on the plurality of names.

8. The method of claim 6, wherein generating the plurality of keyword pairs comprises determining a plurality of subject-object word pairs, each of the plurality of subject-object word pairs comprising a particular sentence subject and a particular sentence object present in at least one of the plurality of sentences.

9. The method of claim 6, wherein generating the plurality of keyword pairs comprises determining a plurality of subject-object word pairs, each of the plurality of subject-object word pairs comprising a particular sentence subject in at least one of two adjacent sentences of the plurality of sentences and a particular sentence object present in at least one of the two adjacent sentences of the plurality of sentences.

10. The method of claim 1, wherein the webpage comprises a Hyper Text Markup Language ("HTML") title and an HTML description, the method further comprising determining a particular keyword set of the plurality of keyword sets based on at least one of the HTML title or the HTML description.

11. The method of claim 10, the method further comprising:
   determining a claim of the at least one of the HTML title or the HTML description;
   determining a claimant of the claim; and
   determining the particular keyword set to include the claim and the claimant.

12. The method of claim 11, further comprising:
   determining a most common personal name in the at least one of the HTML title or the HTML description; and
   determining the claimant to be the most common personal name in the at least one of the HTML title or the HTML description.

13. The method of claim 1, wherein performing the network search comprises initiating a search of an indexed database.

14. The method of claim 1, further comprising performing the network search of at least two of the plurality of keyword sets in parallel.

15. The method of claim 1, wherein the plurality of keyword sets comprise a plurality of keyword pairs, and wherein determining the plurality of keyword sets comprises determining a plurality of subject-object word pairs, the plurality of subject-object word pairs comprising a particular sentence subject in a first sentence of the plurality of sentences and a particular object present in a second sentence of the plurality of sentences adjacent to the first sentence.

16. The method of claim 1, wherein the plurality of values are a plurality of values of a plurality of heuristic features, and wherein determining the plurality of agreement scores comprises:
   determining the plurality of values of a plurality of heuristic features for the plurality of search results;
   dimensionally reducing the plurality of values of the plurality of heuristic features for the plurality of search results to generate a plurality of reduced values;
   generating a plurality of coordinates based on the plurality of reduced values; and
   determining proximities of the plurality of coordinates to determine the plurality of agreement scores.

17. The method of claim 16, further comprising:
   identifying a plurality of keywords in the at least one claim;
   determining a number of the plurality of keywords identified in the at least one claim that are in the plurality of sentences; and
   determining the plurality of values of the plurality of heuristic features based on the comparing of the word embeddings of the plurality of sentences to the word embeddings of the second text of the at least one claim and based on the number of the plurality of keywords identified in the at least one claim that are in the plurality of sentences.

18. The method of claim 1, further comprising:
   identifying a plurality of keywords in the at least one claim;
   determining a number of the plurality of keywords identified in the at least one claim that are in the plurality of sentences;
   determining a relevancy of the at least one claim based on the comparing of the word embeddings of the plurality of sentences to the word embeddings of the second text of the at least one claim and based on the number of the plurality of keywords identified in the at least one claim that are in the plurality of sentences;
   determining the plurality of values based on the comparing of the word embeddings of the plurality of sentences to the word embeddings of the second text of the at least one claim and based on the number of the plurality of keywords identified in the at least one claim that are in the plurality of sentences;
   determining a confidence of the relevancy of the at least one claim based on the first score and the second score; and
   determining the factualness of the content based on the relevancy of the at least one claim and the confidence of the relevancy of the at least one claim.

19. The method of claim 18, further comprising:
   dimensionally reducing the plurality of values to generate a plurality of reduced values;
   generating a plurality of coordinates based on the plurality of reduced values; and
   determining a proximity of the plurality of coordinates to determine the plurality of agreement scores.

20. The method of claim 1, further comprising:
   determining a plurality of cosine similarities based on the comparing of the word embeddings of the plurality of sentences to the word embeddings of the second text; and
   determining the factualness based on the plurality of cosine similarities.

21. The method of claim 1, the method further comprising for each particular claim of the at least one claim for each particular sentence of the plurality of sentences:
   generating word embeddings of the particular sentence;
   generating word embeddings of the second text of the particular claim;
   determining a particular subject of the particular sentence;
   determining a particular object of the particular sentence;
   determining a particular subject of the particular claim;
   determining a particular object of the particular claim;
   comparing the word embeddings of the particular sentence to the word embeddings of the second text of the particular claim to determine a word embedding similarity;
   comparing the particular object of the particular sentence to the particular object of the particular claim to determine an object similarity; and
   comparing the particular subject of the particular sentence to the particular subject of the particular claim to determine a subject similarity; wherein
   the factualness of the content is determined based on the word embedding similarity, the object similarity, and the subject similarity of each particular claim of the at least one claim for each particular sentence of the plurality of sentences and based on the first score of the at least one of the plurality of search results.

22. The method of claim 1, further comprising:
   identifying a plurality of keywords in the at least one claim;
   determining a number of the plurality of keywords identified in the at least one claim that are in each of the plurality of sentences; and
   determining the factualness based on the number of the plurality of keywords in each of the plurality of sentences.

23. The method of claim 22, further comprising, determining the factualness based on the number of the plurality of keywords identified in a particular claim of the at least one claim in each of the plurality of sentences as compared to the number of the plurality of keywords identified in the particular claim.

24. The method of claim 22, further comprising, determining the factualness based on the number of the plurality of keywords identified in a particular claim of the at least one claim in a particular number of consecutive sentences of the plurality of sentences as compared to the number of the plurality of keywords identified in the particular claim.

25. The method of claim 1, further comprising:
determining the second text of a particular claim of the at least one claim comprises a quote;
determining at least a portion of the quote is present in at least one of the plurality of sentences; and
determining the factualness of the content based on the portion of the quote is present in the at least one of the plurality of sentences.

26. The method of claim 1, further comprising detecting quotation marks to detect the at least one claim, at least a portion of the at least one claim located within the quotation marks.

27. The method of claim 1, further comprising comparing the plurality of search results to the content in parallel with comparing the plurality of search results to each other.

28. The method of claim 1, further comprising notifying the user via a notification in a window which obscures at least a portion of the content of the webpage.

29. A computer-implemented method comprising:
detecting a webpage accessed by a user on a computing device via a browser;
determining content comprising a plurality of sentences on the webpage, the plurality of sentences including first text;
applying a first model to the content to determine a plurality of keyword sets comprising a plurality of keyword pairs;
performing a network search based on each of the plurality of keyword sets to generate a plurality of search results indicating a plurality of network locations comprising at least one claim comprising second text;
comparing the second text of each of the at least one claim to each of the plurality of sentences to determine a plurality of similarities;
receiving a plurality of data for a plurality of universal resource locators ("URLs") and a plurality of labels for the plurality of data;
training a second model based on the plurality of data for the plurality of URLs and the plurality of labels for the plurality of data;
determining a plurality of values based on the comparing the plurality of search results to the content;
applying the second model to the plurality of values to determine a score of the at least one of the plurality of search results;
determining a factualness of the content based on the plurality of similarities and based on the score; and
notifying the user via the browser of the factualness of the content via the browser;
wherein applying the first model to the content to determine the plurality of keyword sets comprises:
extracting a plurality of subjects from the plurality of sentences;
extracting a plurality of objects from the plurality of sentences; and
generating the plurality of keyword pairs based on the plurality of subjects and the plurality of objects.

30. The method of claim 29, further comprising generating word embeddings of the plurality of sentences and word embeddings of the second text, wherein comparing the second text of each of the at least one claim to each of the plurality of sentences comprises comparing the word embeddings of each of the plurality of sentences to the word embeddings of the second text of a particular claim of the at least one claim.

31. The method of claim 30, further comprising:
determining a plurality of cosine similarities based on the comparing of the word embeddings of each of the plurality of sentences to the word embeddings of the second text; and
determining the factualness based on the plurality of cosine similarities.

32. The method of claim 29, the method further comprising for each particular claim of the at least one claim for each particular sentence of the plurality of sentences:
generating word embeddings of the particular sentence;
generating word embeddings of the second text of the particular claim;
determining a particular subject of the particular sentence;
determining a particular object of the particular sentence;
determining a particular subject of the particular claim;
determining a particular object of the particular claim;
comparing the word embeddings of the particular sentence to the word embeddings of the second text of the particular claim to determine a word embedding similarity;
comparing the particular object of the particular sentence to the particular object of the particular claim to determine an object similarity; and
comparing the particular subject of the particular sentence to the particular subject of the particular claim to determine a subject similarity; wherein
the factualness is determined based on the word embedding similarity, the object similarity, and the subject similarity of each particular claim of the at least one claim for each particular sentence of the plurality of sentences.

33. The method of claim 29, further comprising detecting quotation marks in at least one of the plurality of search results to detect the at least one claim, at least a portion of the at least one claim located within the quotation marks.

34. A computing system comprising at least one hardware processor and at least one non-transitory computer-readable storage medium coupled to the at least one hardware processor and storing programming instructions for execution by the at least one hardware processor, wherein the programming instructions, when executed, cause the computing system to perform operations comprising:
detecting a webpage accessed by a user on a computing device via a browser;
determining content on the webpage, the content comprising a plurality of sentences including first text;
applying a first model to the content to determine a plurality of keyword sets comprising a plurality of keyword pairs;
performing a network search based on each of the plurality of keyword sets to generate a plurality of search results;
receiving a plurality of data for a plurality of universal resource locators ("URLs") and a plurality of labels for the plurality of data;
training a second model based on the plurality of data for the plurality of URLs and the plurality of labels for the plurality of data;

comparing the plurality of search results to the content;
comparing the plurality of search results to each other;
determining a plurality of values based on the comparing the plurality of search results to the content;
applying the second model to the plurality of values to determine a score of the at least one of the plurality of search results;
determining a factualness of the content based on the comparing of the plurality of search results to the content, based on the comparing of the plurality of the search results to each other and based on the score; and
notifying the user via the browser of the factualness of the content via the browser;
wherein applying the first model to the content to determine the plurality of keyword sets comprises:
extracting a plurality of subjects from the sentences;
extracting a plurality of objects from the sentences; and
generating the plurality of keyword pairs based on the plurality of subjects and the plurality of objects.

* * * * *

UNITED STATES PATENT AND TRADEMARK OFFICE
CERTIFICATE OF CORRECTION

| | |
|---|---|
| PATENT NO. | : 11,941,052 B2 |
| APPLICATION NO. | : 17/342463 |
| DATED | : March 26, 2024 |
| INVENTOR(S) | : Dan Martinec et al. |

It is certified that error appears in the above-identified patent and that said Letters Patent is hereby corrected as shown below:

In the Specification

At Column 6, Line 19, before the word "package", delete "nitk.corpus.names™" and insert therefor --nltk.corpus.names™--.

Signed and Sealed this
Eighteenth Day of June, 2024

Katherine Kelly Vidal
*Director of the United States Patent and Trademark Office*